United States Patent
Gschwind et al.

(10) Patent No.: US 10,620,955 B2
(45) Date of Patent: *Apr. 14, 2020

(54) PREDICTING A TABLE OF CONTENTS POINTER VALUE RESPONSIVE TO BRANCHING TO A SUBROUTINE

(71) Applicant: INTERNATIONAL BUSINESS MACHINES CORPORATION, Armonk, NY (US)

(72) Inventors: Michael K. Gschwind, Chappaqua, NY (US); Valentina Salapura, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 43 days.

This patent is subject to a terminal disclaimer.

(21) Appl. No.: 15/708,223

(22) Filed: Sep. 19, 2017

(65) Prior Publication Data

US 2019/0087187 A1    Mar. 21, 2019

(51) Int. Cl.
*G06F 9/35* (2018.01)
*G06F 9/355* (2018.01)
(Continued)

(52) U.S. Cl.
CPC ........ *G06F 9/30123* (2013.01); *G06F 9/3017* (2013.01); *G06F 9/30054* (2013.01);
(Continued)

(58) Field of Classification Search
CPC .. G06F 9/30123; G06F 9/3844; G06F 9/3861; G06F 9/3013; G06F 9/30043;
(Continued)

(56) References Cited

U.S. PATENT DOCUMENTS 5,241,679 A    8/1993   Nakagawa et al.
5,313,634 A    5/1994   Eickemeyer
(Continued)

FOREIGN PATENT DOCUMENTS

GB    2510966 B    3/2015
WO    WO201524452 A1    2/2015

OTHER PUBLICATIONS

Gschwind, Michael K. et al., "Replacing Table of Contents (TOC)—Setting Instructions in Code with TOC Predicting Instructions," U.S. Appl. No. 15/816,438, filed Nov. 17, 2017, pp. 1-88.
(Continued)

*Primary Examiner* — Daniel H Pan
(74) *Attorney, Agent, or Firm* — Steven Chiu, Esq.; Blanche E. Schiller, Esq.; Heslin Rothenberg Farley & Mesiti P.C.

(57) ABSTRACT

Predicting a Table of Contents (TOC) pointer value responsive to branching to a subroutine. A subroutine is called from a calling module executing on a processor. Based on calling the subroutine, a value of a pointer to a reference data structure, such as a TOC, is predicted. The predicting is performed prior to executing a sequence of one or more instructions in the subroutine to compute the value. The value that is predicted is used to access the reference data structure to obtain a variable value for a variable of the subroutine.

18 Claims, 35 Drawing Sheets

(51) Int. Cl.
*G06F 9/42* (2006.01)
*G06F 9/44* (2018.01)
*G06F 9/30* (2018.01)
*G06F 9/38* (2018.01)
G06F 9/448 (2018.01)
G06F 8/41 (2018.01)
G06F 9/32 (2018.01)

(52) U.S. Cl.
CPC ........ *G06F 9/30101* (2013.01); *G06F 9/3832* (2013.01); *G06F 9/3844* (2013.01); *G06F 9/3861* (2013.01); G06F 8/434 (2013.01); G06F 8/443 (2013.01); G06F 9/30076 (2013.01); G06F 9/30181 (2013.01); G06F 9/325 (2013.01); G06F 9/35 (2013.01); G06F 9/3557 (2013.01); G06F 9/4484 (2018.02)

(58) Field of Classification Search
CPC .......... G06F 9/35; G06F 9/355; G06F 9/3552; G06F 9/3557; G06F 9/3851; G06F 9/30145; G06F 9/3017; G06F 9/30134; G06F 9/30101; G06F 8/41; G06F 8/443; G06F 8/44521; G06F 8/54; G06F 9/30076; G06F 9/30181; G06F 9/30054; G06F 9/3832; G06F 9/321–325; G06F 9/4484; G06F 8/434; G06F 9/3555
USPC ................ 712/202, 228, 245, 248, 241–243; 717/162, 163
See application file for complete search history.

(56) References Cited

U.S. PATENT DOCUMENTS

| | | | |
|---|---|---|---|
| 5,459,682 A | 10/1995 | Sato | |
| 5,526,499 A * | 6/1996 | Bernstein | G06F 8/445 |
| | | | 712/216 |
| 5,581,760 A | 12/1996 | Atkinson | |
| 5,590,329 A | 12/1996 | Goodnow | |
| 5,604,877 A | 2/1997 | Hoyt et al. | |
| 5,737,590 A | 4/1998 | Hara | |
| 5,774,722 A | 6/1998 | Gheith | |
| 5,797,014 A | 8/1998 | Gheith | |
| 5,815,700 A | 9/1998 | Poplingher et al. | |
| 5,822,787 A | 10/1998 | Zucker | |
| 5,835,743 A | 11/1998 | Zucker | |
| 5,850,543 A | 12/1998 | Shiell et al. | |
| 5,892,936 A | 4/1999 | Tran et al. | |
| 5,896,528 A | 4/1999 | Katsuno et al. | |
| 5,898,864 A | 4/1999 | Golla et al. | |
| 5,898,885 A | 4/1999 | Dickol et al. | |
| 5,923,882 A | 7/1999 | Ho | |
| 5,961,636 A * | 10/1999 | Brooks | G06F 9/3863 |
| | | | 712/222 |
| 5,968,169 A | 10/1999 | Pickett | |
| 5,991,871 A | 11/1999 | Zucker | |
| 6,047,362 A | 4/2000 | Zucker | |
| 6,157,999 A | 12/2000 | Rossbach | |
| 6,195,734 B1 | 2/2001 | Porterfield | |
| 6,308,322 B1 | 10/2001 | Serocki et al. | |
| 6,393,549 B1 | 5/2002 | Tran | |
| 6,401,181 B1 | 6/2002 | Franaszek | |
| 6,442,707 B1 | 8/2002 | McGrath et al. | |
| 6,591,359 B1 | 7/2003 | Hass | |
| 6,625,660 B1 | 9/2003 | Guthrie et al. | |
| 6,691,220 B1 | 2/2004 | Guthrie et al. | |
| 6,715,064 B1 | 3/2004 | D'Sa et al. | |
| 6,766,442 B1 | 7/2004 | Kahle et al. | |
| 6,772,323 B2 | 8/2004 | Krishnan et al. | |
| 6,826,747 B1 | 11/2004 | Augsburg et al. | |
| 6,845,442 B1 | 1/2005 | Lepak et al. | |
| 6,880,073 B2 | 4/2005 | Arimilli et al. | |
| 6,965,983 B2 | 11/2005 | Lin | |
| 6,973,563 B1 | 12/2005 | Sander | |
| 7,017,028 B2 | 3/2006 | Ben-David | |
| 7,024,537 B2 | 4/2006 | Pickett et al. | |
| 7,028,166 B2 | 4/2006 | Pickett | |
| 7,069,415 B2 | 6/2006 | Chauvel | |
| 7,089,400 B1 | 8/2006 | Pickett | |
| 7,263,600 B2 | 8/2007 | Sander et al. | |
| 7,296,136 B1 | 11/2007 | Collard | |
| 7,310,799 B2 | 12/2007 | Eisenberg et al. | |
| 7,366,887 B2 | 4/2008 | Waltermann et al. | |
| 7,464,254 B2 | 12/2008 | Sharangpani | |
| 7,571,288 B2 | 8/2009 | Pudipeddi et al. | |
| 7,688,686 B2 | 3/2010 | Polson et al. | |
| 7,809,933 B2 | 10/2010 | Levitan et al. | |
| 8,397,014 B2 * | 3/2013 | Khmelnitsky | G06F 12/0246 |
| | | | 711/103 |
| 8,601,001 B2 | 12/2013 | Bremer et al. | |
| 8,607,211 B2 | 12/2013 | Blainey et al. | |
| 8,639,913 B2 | 1/2014 | Codrescu | |
| 8,769,539 B2 | 7/2014 | Hopper et al. | |
| 8,930,657 B2 | 1/2015 | Balasubramanian | |
| 9,075,636 B2 | 7/2015 | Gschwind | |
| 9,110,675 B1 | 8/2015 | Gschwind et al. | |
| 9,189,234 B2 | 11/2015 | Inoue | |
| 9,244,663 B1 | 1/2016 | Gschwind et al. | |
| 9,244,854 B2 | 1/2016 | Gschwind | |
| 9,250,875 B1 | 2/2016 | Gschwind et al. | |
| 9,298,467 B2 | 3/2016 | Jackson | |
| 9,311,093 B2 | 4/2016 | Gschwind et al. | |
| 9,329,850 B2 | 5/2016 | Gschwind et al. | |
| 9,348,616 B2 | 5/2016 | Gschwind et al. | |
| 9,367,319 B2 | 6/2016 | Wang et al. | |
| 9,384,130 B2 | 7/2016 | Gschwind et al. | |
| 9,424,295 B2 | 8/2016 | Wright et al. | |
| 9,471,514 B1 | 10/2016 | Badishi | |
| 9,513,828 B2 | 12/2016 | Bertolli et al. | |
| 9,639,913 B2 | 5/2017 | Satoh | |
| 9,760,496 B2 | 9/2017 | Eddy | |
| 9,952,844 B1 | 4/2018 | Gschwind | |
| 9,996,294 B2 | 6/2018 | Koester et al. | |
| 10,209,972 B2 | 2/2019 | Gschwind | |
| 2002/0011943 A1 | 1/2002 | Deeley | |
| 2003/0041318 A1 | 2/2003 | Klarer | |
| 2003/0172255 A1 | 9/2003 | Dundas | |
| 2004/0173524 A1 | 9/2004 | Hoogerbrugge | |
| 2005/0132175 A1 | 6/2005 | Henry | |
| 2006/0112374 A1 | 5/2006 | Oliva | |
| 2006/0155703 A1 | 7/2006 | Dejean et al. | |
| 2007/0067364 A1 | 3/2007 | Barbian | |
| 2007/0088937 A1 | 4/2007 | Archambault et al. | |
| 2008/0109614 A1 | 5/2008 | Begon et al. | |
| 2008/0126770 A1 | 5/2008 | Morrow | |
| 2008/0148033 A1 | 6/2008 | Sumner | |
| 2008/0229067 A1 | 9/2008 | Froemming | |
| 2008/0244114 A1 | 10/2008 | Schluessler | |
| 2008/0270736 A1 | 10/2008 | Nishida | |
| 2008/0276069 A1 | 11/2008 | Blaner | |
| 2008/0301420 A1 | 12/2008 | Inoue | |
| 2009/0172814 A1 | 7/2009 | Khosravi | |
| 2009/0210661 A1 | 8/2009 | Alexander | |
| 2009/0271597 A1 | 10/2009 | Kuesel et al. | |
| 2011/0196875 A1 | 8/2011 | Vadlamani et al. | |
| 2011/0289303 A1 * | 11/2011 | Silvera | G06F 9/3004 |
| | | | 712/228 |
| 2012/0131309 A1 | 5/2012 | Johnson | |
| 2012/0297165 A1 | 11/2012 | Kruger | |
| 2013/0212316 A1 | 8/2013 | Nassie | |
| 2013/0262783 A1 | 10/2013 | Okada | |
| 2013/0263153 A1 | 10/2013 | Gschwind | |
| 2013/0275734 A1 | 10/2013 | Toll et al. | |
| 2014/0047419 A1 | 2/2014 | Gaster | |
| 2014/0095833 A1 | 4/2014 | Gschwind | |
| 2015/0033214 A1 | 1/2015 | Qi | |
| 2015/0046691 A1 | 2/2015 | Heil et al. | |
| 2015/0261510 A1 | 9/2015 | Gschwind | |
| 2015/0301841 A1 | 10/2015 | Mackintosh | |
| 2015/0309812 A1 | 10/2015 | Gschwind et al. | |
| 2015/0310644 A1 * | 10/2015 | Zhou | G06F 16/9024 |
| | | | 345/440 |

(56) References Cited

U.S. PATENT DOCUMENTS

| | | |
|---|---|---|
| 2016/0055003 A1 | 2/2016 | Clancy et al. |
| 2016/0070548 A1 | 3/2016 | Gschwind |
| 2016/0117155 A1 | 4/2016 | Salmon_Legagneur et al. |
| 2016/0124850 A1 | 5/2016 | Gschwind |
| 2016/0179546 A1 | 6/2016 | Yamada |
| 2016/0180079 A1 | 6/2016 | Sahita et al. |
| 2016/0202980 A1 | 7/2016 | Henry et al. |
| 2016/0263153 A1 | 9/2016 | O'Hara |
| 2017/0003941 A1 | 1/2017 | Gschwind |
| 2017/0147161 A1 | 5/2017 | White |
| 2017/0193401 A1 | 7/2017 | Grehant |
| 2017/0220353 A1 | 8/2017 | Jackson |
| 2017/0262387 A1 | 9/2017 | Sell |
| 2018/0113685 A1 | 4/2018 | Gschwind |
| 2018/0113688 A1 | 4/2018 | Gschwind |
| 2018/0113689 A1 | 4/2018 | Gschwind |
| 2018/0113692 A1 | 4/2018 | Gschwind |
| 2018/0113693 A1 | 4/2018 | Gschwind |
| 2018/0113697 A1 | 4/2018 | Gschwind |
| 2018/0113723 A1 | 4/2018 | Gschwind |
| 2018/0113725 A1 | 4/2018 | Gschwind |
| 2018/0113726 A1 | 4/2018 | Gschwind |
| 2018/0219962 A1 | 8/2018 | Lahman |
| 2018/0246813 A1 | 8/2018 | Goldsack |
| 2019/0004980 A1 | 1/2019 | Maor |
| 2019/0087098 A1 | 3/2019 | Gschwind |
| 2019/0087099 A1 | 3/2019 | Gschwind |
| 2019/0087162 A1 | 3/2019 | Gschwind |
| 2019/0087163 A1 | 3/2019 | Gschwind |
| 2019/0087189 A1* | 3/2019 | Gschwind ............ G06F 9/3861 |
| 2019/0087190 A1 | 3/2019 | Gschwind |
| 2019/0087191 A1 | 3/2019 | Gschwind |
| 2019/0087334 A1 | 3/2019 | Gschwind |
| 2019/0087335 A1 | 3/2019 | Gschwind |
| 2019/0087336 A1 | 3/2019 | Gschwind |
| 2019/0087337 A1 | 3/2019 | Gschwind |
| 2019/0087346 A1 | 3/2019 | Gschwind |
| 2019/0087347 A1 | 3/2019 | Gschwind |

OTHER PUBLICATIONS

Gschwind, Michael K. et al., "Initializing a Data Structure for Use in Predicting Table of Contents Pointer Values," U.S. Appl. No. 15/816,421, filed Nov. 17, 2017, pp. 1-88.

Gschwind, Michael K. et al., "Predicting a Table of Contents Pointer Value Responsive to Branching to a Subroutine," U.S. Appl. No. 15/819,420, filed Nov. 21, 2017, pp. 1-88.

Gschwind, Michael K. et al., "Table of Contents Cache Entry Having a Pointer for a Range of Addresses," U.S. Appl. No. 15/825,814, filed Nov. 29, 2017, pp. 1-88.

Gschwind, Michael K. et al., "Set Table of Contents (TOC) Register Instruction," U.S. Appl. No. 15/822,801, filed Nov. 27, 2017, pp. 1-88.

Gschwind, Michael K. et al., "Code Generation Relating to Providing Table of Contents Pointer Values," U.S. Appl. No. 15/822,823, filed Nov. 27, 2017, pp. 1-88.

Gschwind, Michael K. et al., "Read-Only Table of Contents Register," U.S. Appl. No. 15/822,834, filed Nov. 27, 2017, pp. 1-88.

List of IBM Patents and/or Patent Applications Treated as Related, dated Jan. 25, 2018, pp. 1-2.

IBM, "z/Architecture—Principles of Operation," IBM Publication No. SA22-7832-10, Eleventh Edition, Mar. 2015, pp. 1-1732.

IBM, "Power ISA—V2.07B," Apr. 2015, pp. 1-1527.

Mel, Peter and Tim Grance, "The NIST Definition of Cloud Computing," National Institute of Standards and Technology, Information Technology Laboratory, Special Publication 800-145, Sep. 2011, pp. 1-7.

"64-Bit ELF V2 ABI Specification: Power Architecture," https://openpowerfoundation.org/?resource_lib=64-bit-elf-v2-abi-specification-power-architecture, downloaded from internet Aug. 7, 2017, p. 1.

Kaiser, Scott et al., "A Method for Predicting Support Escalations with Machine Learning," IP.com No. IPCOM000236818D, May 16, 2014, pp. 1-8 (+ cover).

Poblocki, Andrzej, "Predicting the Length of Translated Text Using Statistics," IP.com No. IPCOM000230931D, Sep. 18, 2013, pp. 1-3 (+ cover).

Anonymous, "Storing Profiling Information for Use in Future Virtual Machine Invokations for Optimization Decisions," IP.com No. IPCOM000216308D, Mar. 29, 2012, pp. 1-5 (+ cover).

Hu, Shiliang et al., "Using Dynamic Binary Translation to Fuse Dependent Instructions, Proceedings of the International Symposium on Code Generation and Optimization," Sep. 2004, pp. 1-12.

Waterman, Andrew, "Design of the RISC-V Instruction Set Architecture," Electrical Engineering and Computer Sciences—University of California at Berkeley, Technical Report No. UCB/EECS-2016-1, Jan. 2016, pp. 1-117.

IBM, "Configurable Microprocessor Branch Prediction for Performance and Power Savings," IP.com No. IPCOM000028112D, Apr. 2004, pp. 1-4 (+ cover).

Das, Moumita et al., "Attacks on Branch Predictors: Am Empirical Exploration," ICISS 2015, Dec. 2015, pp. 511-520.

Boogerd, Cathal et al., "On the Use of Data Flow Analysis in Static Profiling," Eighth IEEE International Working Conference on Source Code Analysis and Manipulation, Jul. 2008, pp. 79-88.

Pophale, Swaroop et al., "Evaluating OpenMP Affinity on the POWER8 Architecture," IWOMP 2016, Oct. 2016, pp. 35-46.

Sinharoy, B. et al., "IBM POWER8 Processor Core Microarchitecture," IBM Journal of Research and Development, vol. 59, No. 1, Paper 3, Jan./Feb. 2015, pp. 2:1-2:21.

Abalenkovs, M. et al., "Parallel Programming Models for Dense Linear Algebra on Heterogeneous Systems," Supercomputing Frontiers and Innovations, 2015, vol. 2, No. 4, Mar. 2015, pp. 67-86.

Anonymous, "Method and System for Improved Branch Predictions," IP.com No. IPCOM000214467D, Jan. 2012, pp. 1-2 (+ cover).

Anonymous, "Address Mode Aware Branch Prediction with Shutdown Capability," IP.com No. IPCOM000235852D, Mar. 2014, pp. 1-5.

Anonymous, "A Unified Scalar and SIMD Instruction Set Architecture: Repurposing a Scalar Instruction Set for SIMD Instruction via Mode-Sensitive Semantics," IP.com No. IPCOM000241485D, May 5, 2015, pp. 1-3 (+ cover).

IBM, "A Technique for Adding Additional Registers to an Instruction Set Architecture," IP.com No. IPCOM000188078D, Sep. 2009, pp. 1-5 (+ cover).

Gschwind, Michael K. et al., "Replacing Table of Contents (TOC)—Setting Instructions in Code With TOC Predicting Instructions," U.S. Appl. No. 15/708,249, filed Sep. 19, 2017, pp. 1-92.

Gschwind, Michael K. et al., "Initializing a Data Structure for Use in Predicting Table of Contents Pointer Values," U.S. Appl. No. 15/708,235, filed Sep. 19, 2017, pp. 1-90.

Gschwind, Michael K. et al., "Table of Contents Cache Entry Having a Pointer for a Range of Addresses," U.S. Appl. No. 15/708,216, filed Sep. 19, 2017, pp. 1-93.

Gschwind, Michael K. et al., "Set Table of Contents (TOC) Register Instruction," U.S. Appl. No. 15/708,207, filed Sep. 19, 2017, pp. 1-92.

Gschwind, Michael K. et al., "Code Generation Relating to Providing Table of Contents Pointer Values," U.S. Appl. No. 15/708,199, filed Sep. 19, 2017, pp. 1-90.

Gschwind, Michael K. et al., "Read-Only Table of Contents Register," U.S. Appl. No. 15/708,192, filed Sep. 19, 2017, pp. 1-90.

List of IBM Patents or Patent Applications Treated as Related, Sep. 28, 2017, pp. 1-2.

Collins, Jamison et al., "Pointer Cache Assisted Prefetching," Nov. 2002, Proceedings of the 35th Annual International Symposium on Microarchitecture, pp. 1-12.

Gschwind, Michael et al., "Table of Contents Cache Entry Having a Pointer for a Range of Addresses," U.S. Appl. No. 16/515,697, filed Jul. 18, 2019, pp. 1-91.

Gschwind, Michael et al., "Table of Contents Cache Entry Having a Pointer for a Range of Addresses," U.S. Appl. No. 16/515,739, filed Jul. 18, 2019, pp. 1-88.

(56) References Cited

OTHER PUBLICATIONS

Gschwind, Michael K. et al., "Set Table of Contents (Toc) Register Instruction," U.S. Appl. No. 16/542,830, filed Aug. 16, 2019, pp. 1-90.

Gschwind, Michael et al., "Predicting a Table of Contents Pointer Value Responsive to Branching to a Subroutine," U.S. Appl. No. 16/590,439, filed Oct. 2, 2019, pp. 1-93.

List of IBM Patents and/or Patent Applications Treated as Related, dated Oct. 29, 2019, pp. 1-2.

* cited by examiner

TOC CACHE  1402

| TOC SETTER ADDRESS | TOC VALUE | FUNC INITS TOC (OPTIONAL) | USAGE TRACKING (OPTIONAL) |
|---|---|---|---|
| STR #1 OR FUNC #1 | TOC #1 | | |
| STR #2 OR FUNC #2 | TOC #2 | | |
| STR #3 OR FUNC #3 | TOC #3 | | |
| ... | ... | | |
| STR #n OR FUNC #n | TOC #n | | |

| TOC CACHE 1600 | | | |
|---|---|---|---|
| TOC RANGE ADDRESS_FROM 1602 | TOC RANGE ADDRESS_TO 1604 | TOC VALUE 1606 | USAGE TRACKING (OPTIONAL) 1608 |
| MODULE#1.start | MODULE #1.end | TOC #1 | |
| MODULE#2.start | MODULE #2.end | TOC #2 | |
| MODULE#3.start | MODULE #3.end | TOC #3 | |
| ... | ... | | |
| MODULE#n.start | MODULE #n.end | TOC #n | |

FIG. 16

LOAD TOC-RELATIVE LONG

LOAD ADDRESS TOC-RELATIVE LONG                    2100

LATL

2200
TOCADDIS

2300
ADDTOCIS+

DETERMINE WHETHER A CURRENT INSTRUCTION IN THE SUBROUTINE CORRESPONDS TO THE SEQUENCE OF ONE OR MORE INSTRUCTIONS TO COMPUTE THE VALUE ~3120

INSERT IN THE CODE, BASED ON DETERMINING THE CURRENT INSTRUCTION CORRESPONDS TO THE SEQUENCE OF ONE OR MORE INSTRUCTIONS TO COMPUTE THE VALUE, A CHECK INSTRUCTION TO CHECK THE PREDICTION OF THE VALUE ~3122

THE INSERTING REPLACING THE SEQUENCE OF ONE OR MORE INSTRUCTIONS ~3124

DETERMINE WHETHER A CHECK INDICATOR IS SET ~3126

DETERMINE WHETHER THE CURRENT INSTRUCTION CORRESPONDS TO THE SEQUENCE OF ONE OR MORE INSTRUCTIONS TO COMPUTE THE VALUE, BASED ON DETERMINING THE CHECK INDICATOR IS SET ~3128

DETERMINE, BASED ON DETERMINING THE CURRENT INSTRUCTION DOES NOT CORRESPOND TO THE SEQUENCE OF ONE OR MORE INSTRUCTIONS TO COMPUTE THE VALUE, WHETHER THE CURRENT INSTRUCTION CORRESPONDS TO A SEQUENCE OF ONE OR MORE INSTRUCTIONS TO USE THE VALUE ~3130

PERFORM RECOVERY, BASED AT LEAST ON DETERMINING THAT THE CURRENT INSTRUCTION CORRESPONDS TO THE SEQUENCE OF ONE OR MORE INSTRUCTIONS TO USE THE VALUE ~3132

THE SEQUENCE OF ONE OR MORE INSTRUCTIONS INCLUDES A LOAD INSTRUCTION ~3134

OBTAIN A CURRENT VALUE OF THE POINTER PRIOR TO THE PREDICTING ~3136

STORE THE CURRENT VALUE IN A RENAME REGISTER FOR USE IN RECOVERY ~3138

FIG. 31B

PREDICTING A TABLE OF CONTENTS POINTER VALUE RESPONSIVE TO BRANCHING TO A SUBROUTINE

BACKGROUND

One or more aspects relate, in general, to processing within a computing environment, and in particular, to facilitating such processing.

Many computing systems use a Global Offset Table (GOT) or a Table of Contents (TOC) to populate variables within source code. For instance, a compiler generates object code from source code, without knowing the final address or displacement of the code/data. Specifically, the compiler generates object code that will access a variable address reference data structure (e.g., a Global Offset Table or a Table of Contents) for variable values without knowing the final size of the data structure or offsets/addresses of various data sections. Placeholders for this information are left in the object code and updated by a linker.

To access the GOT or TOC, a pointer is used. The pointer is typically computed by a sequence of instructions. These instructions often depend on computed registers which are not always readily available in a processor. Consequently, accesses to variables that depend on the TOC (i.e., variables other than local variables) may be delayed.

SUMMARY

Shortcomings of the prior art are overcome and additional advantages are provided through the provision of a computer program product for facilitating processing within a computing environment. The computer program product includes a computer readable storage medium readable by a processing circuit and storing instructions for performing a method. The method includes, for instance, calling a subroutine from a calling module executing on a processor. Based on calling the subroutine, a value of a pointer to a reference data structure is predicted. The predicting is performed prior to executing a sequence of one or more instructions in the subroutine to compute the value. The value that is predicted is used to access the reference data structure to obtain a variable value for a variable of the subroutine. By predicting the value of the pointer, based on calling the subroutine, performance is improved.

In a further aspect, a current value of the pointer is obtained prior to the predicting, and the current value is stored in a recovery location. This is to facilitate recovery in the event of a misprediction. A determination is made, in one embodiment, that the value predicted for the pointer is incorrect. Based on determining the value predicted for the pointer is incorrect, the current value is recovered from the recovery location.

In yet a further aspect, the value predicted for the pointer is loaded in a defined location. This facilitates processing.

Yet further, in one aspect, a determination is made as to whether a current instruction in the subroutine corresponds to the sequence of one or more instructions to compute the value. Based on determining the current instruction corresponds to the sequence of one or more instructions to compute the value, a check instruction is inserted in the code to check the prediction of the value. The inserting replaces the sequence of one or more instructions.

In a further embodiment, a determination is made as to whether a check indicator is set. Based on determining the check indicator is set, a determination is made as to whether the current instruction corresponds to the sequence of one or more instructions to compute the value.

As one example, based on determining the current instruction does not correspond to the sequence of one or more instructions to compute the value, a determination is made as to whether the current instruction corresponds to a sequence of one or more instructions to use the value. Based at least on determining that the current instruction corresponds to the sequence of one or more instructions to use the value, recovery is performed.

In one example, the sequence of one or more instructions includes a load instruction. In another example, the predicting includes using a reference data structure pointer cache to obtain the value.

Further, in one embodiment, a current value of the pointer is obtained prior to the predicting, and the current value is stored in a rename register for use in recovery.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 14A depicts one example of a TOC pointer cache (also referred to herein as a TOC cache), in accordance with an aspect of the present invention;

FIG. 16 depicts another example of a TOC cache, in accordance with an aspect of the present invention;

FIGS. 31A-31B depict one embodiment of facilitating processing within a computing environment, in accordance with an aspect of the present invention;

DETAILED DESCRIPTION

Figure 1A:
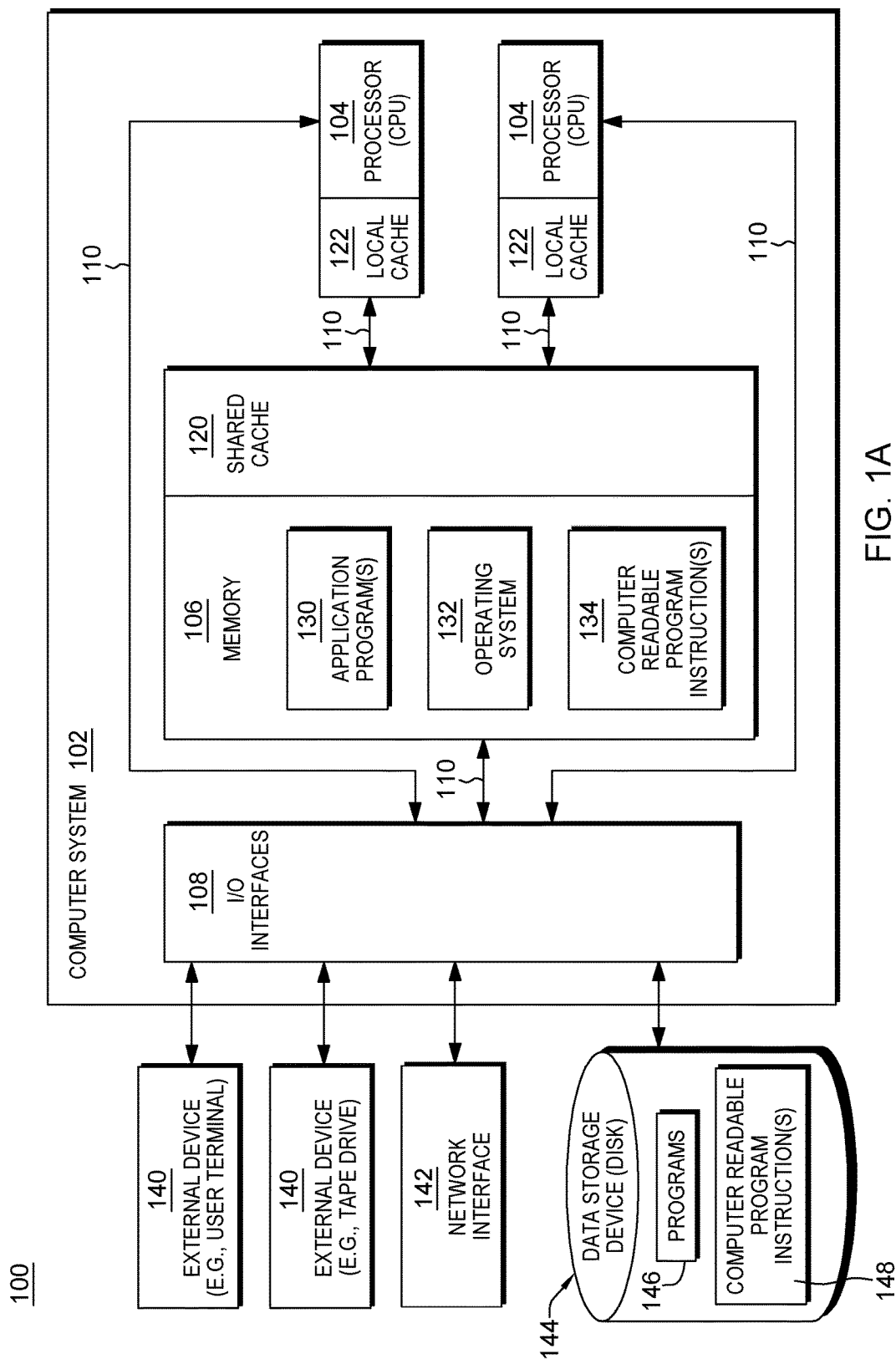
FIG. 1A depicts one example of a computing environment to incorporate and use one or more aspects of the present invention.

In accordance with an aspect of the present invention, the providing of a pointer to a reference data structure, such as a Table of Contents (TOC) or a Global Offset Table (GOT), is facilitated. In one example, a Set TOC Register (STR) instruction is provided that loads a register (or other defined location) with a value used to access the TOC (e.g., a pointer value). Although a TOC is referred to herein as an example, the aspects, features and techniques described herein are equally applicable to a GOT or other similar type structures.

TOC pointer value, TOC pointer, TOC value, and pointer to the TOC, as examples, are used interchangeably herein. The TOC register holds a TOC pointer, and therefore, may be referred to herein as a TOC pointer register or a TOC register.

Further, TOC pointer cache, TOC pointer tracking structure, TOC pointer table, etc. are also referred to herein as TOC cache, TOC tracking structure, TOC table, etc., respectively. Similarly, reference data structure pointer cache and reference data structure cache are used interchangeably herein. Others examples may also exist.

In a further aspect, sequences of instructions typically used to set a TOC register are replaced by a Set TOC Register instruction. As an example, a sequence of instructions includes one or more instructions. Further, a verify operation may be used to verify the TOC register value. A TOC register may be, for instance, a hardware register, or an architected register, such as a general purpose register (e.g., r2, r12), defined by an architecture or specified by an Application Binary Interface (ABI). Other examples are possible.

In yet a further aspect, the TOC pointer value is predicted responsive to branching to a subroutine.

In still a further aspect, embodiments of a TOC cache are provided to facilitate processing. A TOC cache (or other reference data structure cache) is, for instance, a high-speed in-processor cache that includes various TOC pointer values to be predicted for different locations/modules in the program that have recently been used.

Yet further, an aspect is provided to prepare and initialize a TOC tracking structure for TOC pointer value prediction. A TOC tracking structure may be, for instance, a TOC cache or an in-memory table populated with TOC pointer values to be predicted for different location/modules in the program.

In a further aspect, a pseudo-register (also referred to herein as a read-only TOC register) is used to provide the pointer value, along with TOC register addressing modes. The pseudo-register is not a hardware or architected register, nor does it have storage associated therewith; instead, it is a TOC pointer value obtained, e.g., from a TOC cache (e.g., the value that would have been produced by STR).

Moreover, in a further aspect, code is generated and/or compiled with a Set TOC Register instruction and/or to use read-only TOC registers.

Various aspects are described herein. Further, many variations are possible without departing from a spirit of aspects of the present invention. It should be noted that, unless otherwise inconsistent, each aspect or feature described herein and variants thereof may be combinable with any other aspect or feature.

One embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

As shown in FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 120, such as a shared cache, which may be coupled to local caches 122 of processors 104. Further, memory 106 may include one or more programs or applications 130, an operating system 132, and one or more computer readable program instructions 134. Computer readable program instructions 134 may be configured to carry out functions of embodiments of aspects of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
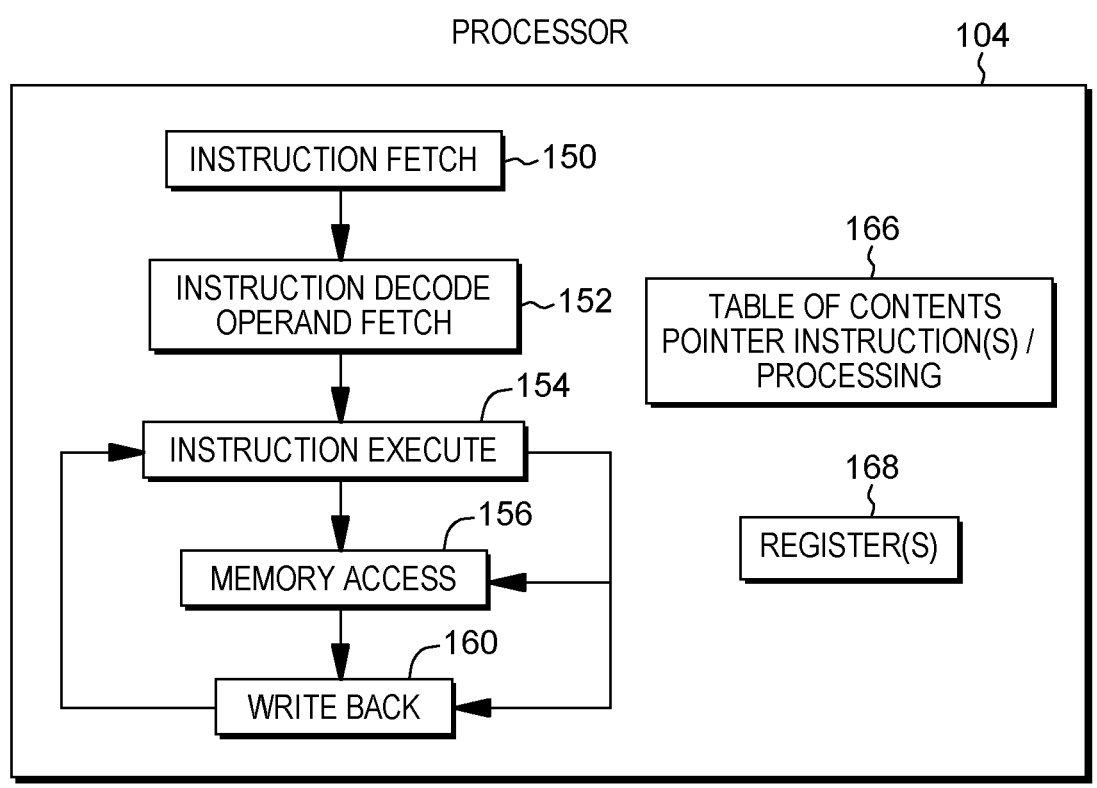
FIG. 1B depicts further details of a processor of FIG. 1A, in accordance with one or more aspects of the present invention.

Further details regarding one example of processor 104 are described with reference to FIG. 1B. Processor 104 includes a plurality of functional components used to execute instructions. These functional components include, for instance, an instruction fetch component 150 to fetch instructions to be executed; an instruction decode unit 152 to decode the fetched instructions and to obtain operands of the decoded instructions; instruction execution components 154 to execute the decoded instructions; a memory access component 156 to access memory for instruction execution, if necessary; and a write back component 160 to provide the results of the executed instructions. One or more of these components may, in accordance with an aspect of the present invention, be used to execute one or more instructions and/or operations associated with Table of Contents (TOC) pointer processing 166.

Processor 104 also includes, in one embodiment, one or more registers 168 to be used by one or more of the functional components. Processor 104 may include additional, fewer and/or other components than the examples provided herein.

Further details regarding an execution pipeline of processor 104 are described with reference to FIG. 1C. Although various processing stages of the pipeline are depicted and described herein, it will be understood that additional, fewer and/or other stages may be used without departing from the spirit of aspects of the invention.

Figure 1C:
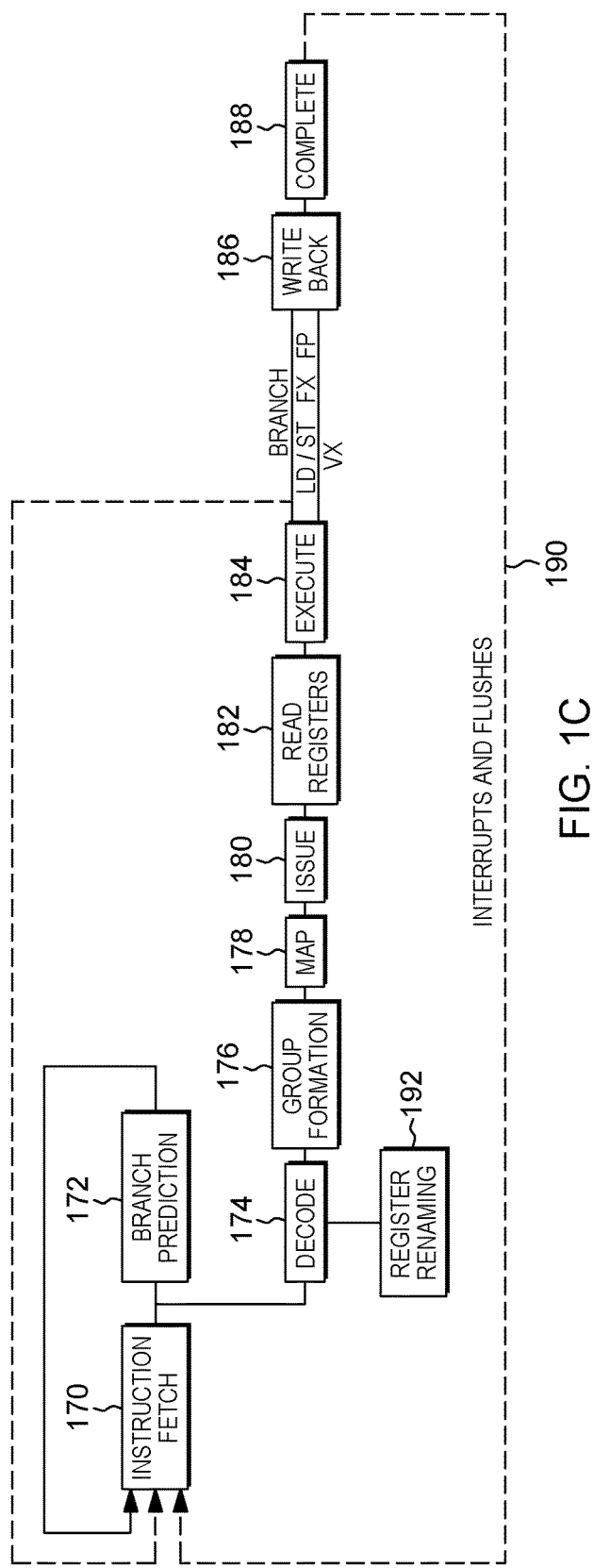
FIG. 1C depicts further details of one example of an instruction execution pipeline used in accordance with one or more aspects of the present invention.

Referring to FIG. 1C, in one embodiment, an instruction is fetched 170 from an instruction queue, and branch prediction 172 and/or decoding 174 of the instruction may be performed. The decoded instruction may be added to a group of instructions 176 to be processed together. The grouped instructions are provided to a mapper 178 that determines any dependencies, assigns resources and dispatches the group of instructions/operations to the appropriate issue queues. There are one or more issue queues for the different types of execution units, including, as examples, branch, load/store, floating point, fixed point, vector, etc. During an issue stage 180, an instruction/operation is issued to the appropriate execution unit. Any registers are read 182 to retrieve its sources, and the instruction/operation executes during an execute stage 184. As indicated, the execution may be for a branch, a load (LD) or a store (ST), a fixed point operation (FX), a floating point operation (FP), or a vector operation (VX), as examples. Any results are written to the appropriate register(s) during a write back stage 186. Subsequently, the instruction completes 188. If there is an interruption or flush 190, processing may return to instruction fetch 170.

Further, in one example, coupled to the decode unit is a register renaming unit 192, which may be used in the saving/restoring of registers.

Figure 1D:
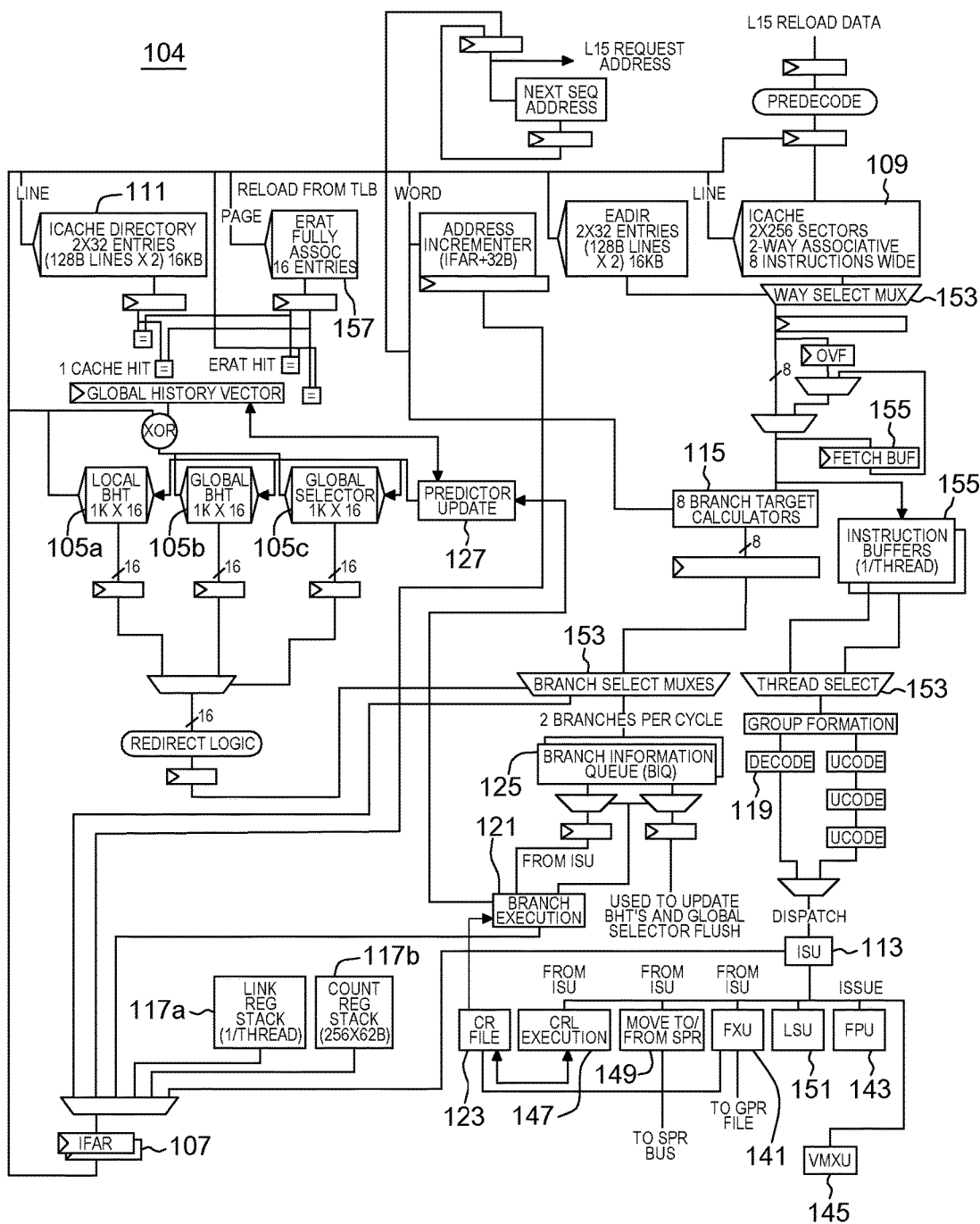
FIG. 1D depicts further details of one example of a processor of FIG. 1A, in accordance with an aspect of the present invention.

Additional details regarding a processor are described with reference to FIG. 1D. In one example, a processor, such as processor 104, is a pipelined processor that may include prediction hardware, registers, caches, decoders, an instruction sequencing unit, and instruction execution units, as examples. The prediction hardware includes, for instance, a local branch history table (BHT) 105*a*, a global branch history table (BHT) 105*b*, and a global selector 105*c*. The prediction hardware is accessed through an instruction fetch address register (IFAR) 107, which has the address for the next instruction fetch.

The same address is also provided to an instruction cache 109, which may fetch a plurality of instructions referred to as a "fetch group". Associated with instruction cache 109 is a directory 111.

The cache and prediction hardware are accessed at approximately the same time with the same address. If the prediction hardware has prediction information available for an instruction in the fetch group, that prediction is forwarded to an instruction sequencing unit (ISU) 113, which, in turn, issues instructions to execution units for execution. The prediction may be used to update IFAR 107 in conjunction with branch target calculation 115 and branch target prediction hardware (such as a link register prediction stack 117*a* and a count register stack 117*b*). If no prediction information is available, but one or more instruction decoders 119 find a branch instruction in the fetch group, a prediction is created for that fetch group. Predicted branches are stored in the prediction hardware, such as in a branch information queue (BIQ) 125, and forwarded to ISU 113.

A branch execution unit (BRU) 121 operates in response to instructions issued to it by ISU 113. BRU 121 has read access to a condition register (CR) file 123. Branch execution unit 121 further has access to information stored by the branch scan logic in branch information queue 125 to determine the success of a branch prediction, and is operatively coupled to instruction fetch address register(s) (IFAR) 107 corresponding to the one or more threads supported by the microprocessor. In accordance with at least one embodiment, BIQ entries are associated with, and identified by an identifier, e.g., by a branch tag, BTAG. When a branch associated with a BIQ entry is completed, it is so marked. BIQ entries are maintained in a queue, and the oldest queue entries are de-allocated sequentially when they are marked as containing information associated with a completed branch. BRU 121 is further operatively coupled to cause a predictor update when BRU 121 discovers a branch misprediction.

When the instruction is executed, BRU 121 detects if the prediction is wrong. If so, the prediction is to be updated. For this purpose, the processor also includes predictor update logic 127. Predictor update logic 127 is responsive to an update indication from branch execution unit 121 and configured to update array entries in one or more of the local BHT 105*a*, global BHT 105*b*, and global selector 105*c*. The predictor hardware 105*a*, 105*b*, and 105*c* may have write ports distinct from the read ports used by the instruction fetch and prediction operation, or a single read/write port may be shared. Predictor update logic 127 may further be operatively coupled to link stack 117*a* and count register stack 117*b*.

Referring now to condition register file (CRF) 123, CRF 123 is read-accessible by BRU 121 and can be written to by the execution units, including but not limited to, a fixed point unit (FXU) 141, a floating point unit (FPU) 143, and a vector multimedia extension unit (VMXU) 145. A condition register logic execution unit (CRL execution) 147 (also referred to as the CRU), and special purpose register (SPR) handling logic 149 have read and write access to condition register file (CRF) 123. CRU 147 performs logical operations on the condition registers stored in CRF file 123. FXU 141 is able to perform write updates to CRF 123.

Processor 104 further includes, a load/store unit 151, and various multiplexors 153 and buffers 155, as well as address translation tables 157, and other circuitry.

Processor 104 executes programs (also referred to as applications) that include variables. A variable has an identifier (e.g., name) and refers to a storage location that includes a value (e.g., information, data). During runtime, a program determines addresses of the variables, which were not known at compile time, by using the TOC.

When a subroutine is called, the subroutine establishes its own TOC because if it is in a different module than the function that called it, it will have its own data dictionary (i.e., TOC) and a pointer to that dictionary is to be established. Establishing such a pointer is expensive.

One example of code used to establish a TOC pointer is shown below, e.g., with reference to an example ABI, such as the Open POWER ELFv2 ABI.

In accordance with one such example embodiment, the caller initializes one or more registers with the address of the called function, e.g., in accordance with an ABI.

In the following example, two registers, r12 and ctr, are initialized with the address of the called function:

```
...
ld      r12, <...>    // Load r12
mtctr   r12           // Move value of r12 to CTR
bctrl                 // Branch to CTR
nop
...
```

In accordance with an established ABI, the called function initializes a TOC pointer. A variety of implementations exist. In one embodiment, the entry address from the one or more registers initialized by the caller is used, when the address function is called via a register-indirect call. For example, in accordance with an example ABI, such as the Open POWER ELFv2 ABI, the TOC pointer register, r2, may be initialized as follows using the callee's function entry address loaded into r12 by the caller by the function called "foo":

```
_foo:
    // skip the next 2 instructions when _foo is called from local module
    .localentry _foo, 2
    // Add distance from _foo to the TOC pointer value .TOC.
    addis   r2, r12, #higha              // add higher bits of offset to r12
            (_foo - .TOC.)                // place result in r2
                                          // r2 is the TOC register
    addi    r2, r2, #low (_foo - .TOC.)  // add lower bits of offset to r2
                                          // store result in r2
    // Local entry point coincides with start of traditional function
    prologue
    ...
```

In accordance with an aspect of the present invention, instead of determining the TOC pointer using, for instance, the code above, which is expensive in many microprocessor implementations, a Set TOC Register (STR) instruction is used. The Set TOC Register instruction loads a register (or other defined location) with a value of a pointer to the TOC, e.g., by performing a look-up in the processor. Since the TOC is shared by all (or a set) of functions of a module, only a small number of TOC register values are to be remembered and associated with a range of addresses. As examples, the Set TOC Register instruction may be implemented as an architected hardware instruction or an internal operation.

Figure 2:
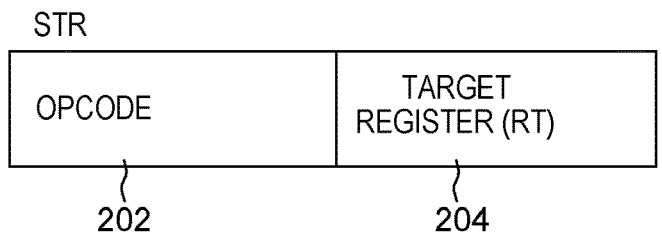
FIG. 2 depicts one example of a Set TOC Register (STR) instruction, in accordance with an aspect of the present invention.

One example of a Set TOC Register (STR) instruction is described with reference to FIG. 2. In one example, a Set TOC Register instruction 200 includes an operation code (opcode) field 202 that includes an operation code indicating a set TOC register operation, and a target register (RT) field 204 specifying a location, such as a register, to receive the value of the TOC pointer.

Although, in this example, one opcode field is shown, in other embodiments, there may be a plurality of opcode fields. Other variations are also possible.

As indicated, in one example, target register field 204 identifies a register to be loaded with a TOC pointer value. The STR instruction loads the register specified by field 204 with the value of the TOC pointer for a present code sequence, in which the code sequence corresponds to code following the address of the STR instruction.

There are a variety of possible implementations of processing associated with the STR instruction including, for instance, a software implementation, a hardware-assisted implementation, and a hardware implementation. In the software implementation, based on executing the STR instruction, an exception is raised and the setting of the TOC register is emulated by supervisor code (e.g., the operating system or hypervisor) or by a user-mode interrupt handler (e.g., using an event-based branch facility in accordance with a definition of the Power Architecture). In the hardware-assisted implementation, the hardware provides a cache (e.g., a small table or other data structure to store most frequently used values) or predictor for frequent values and traps to the software. The supervisor code or user-mode interrupt handler then processes the instruction, as described above. In the hardware implementation, the hardware provides a cache or predictor for frequent values, and based on a miss in the cache, looks up a table (or other data structure that has been populated in software with the TOC pointer values). Further details regarding the implementation choices are described with reference to FIGS. 3-5.

Figure 3:
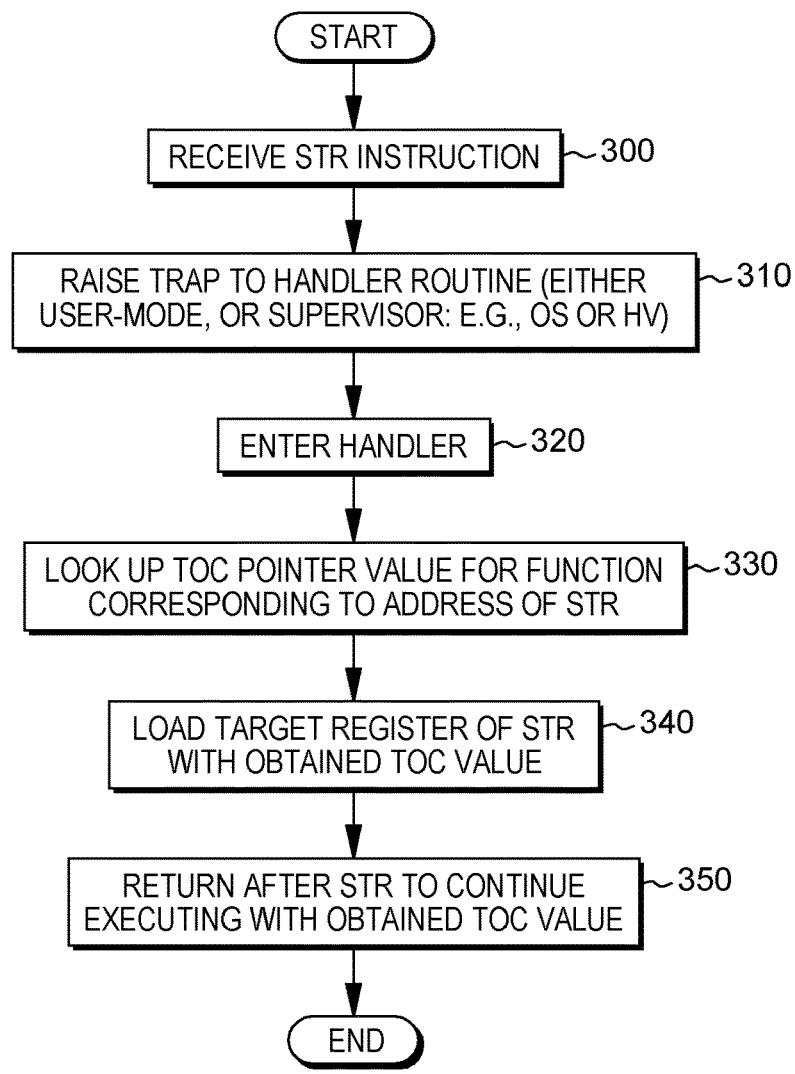
FIG. 3 depicts one example of processing associated with a Set TOC Register instruction, in accordance with an aspect of the present invention.

One implementation that uses software, e.g., supervisor code or user-mode interrupt handler, is described with reference to FIG. 3. Referring to FIG. 3, in one example, the STR instruction is received by a processor, STEP 300, and a trap is raised to a handler routine, such as a supervisor (e.g., the operating system (OS) or a hypervisor (HV)), or user-mode interrupt code, STEP 310. The handler routine is entered, STEP 320, and the handler looks up, e.g., in a cache or table, the TOC pointer value for the function corresponding to the address of the STR instruction, STEP 330. The obtained TOC value is loaded in the target register of the STR instruction, STEP 340. Thereafter, processing returns to the code after the STR instruction to continue executing with the obtained TOC value, STEP 350.

Figure 4:
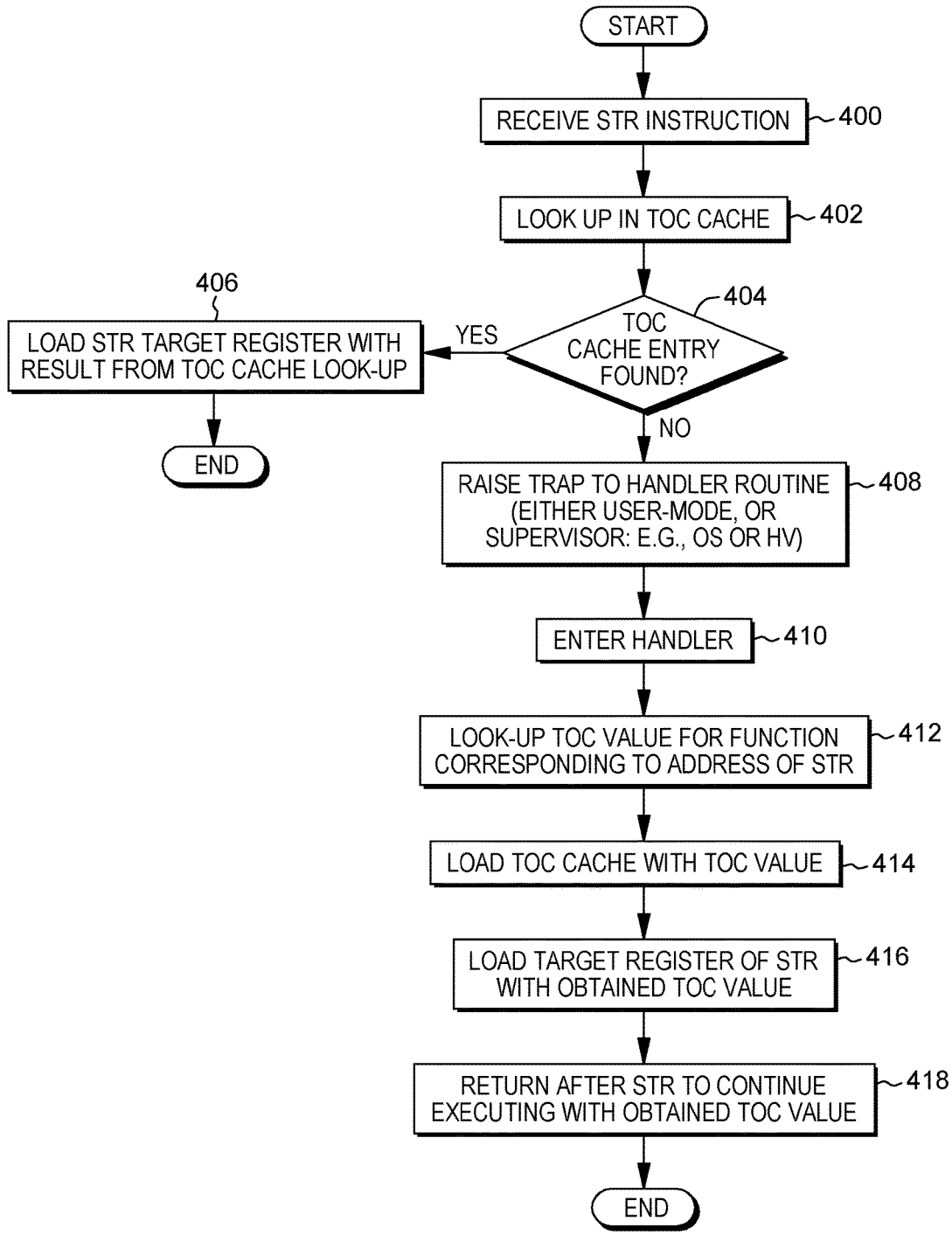
FIG. 4 depicts another example of processing associated with a Set TOC Register instruction, in accordance with an aspect of the present invention.

Another implementation is described with reference to FIG. 4, in which a hardware-assisted implementation is described. Referring to FIG. 4, an STR instruction is received by a processor, STEP 400, and a TOC cache look-up is performed to locate the TOC value for the function that includes the STR instruction, STEP 402. A determination is made as to whether a TOC cache entry for the function was found, INQUIRY 404. If the TOC cache entry is found, then the STR target register is loaded with the result from the TOC cache look-up, STEP 406. Otherwise, a trap is raised to the handler routine, as described above, STEP 408. For instance, the handler routine is entered, STEP 410, and a look-up is performed, e.g., in a table, for the TOC value for the function corresponding to the address of the STR instruction, STEP 412. The TOC cache is loaded with the TOC value, STEP 414, and the target register of the STR instruction is loaded with the obtained TOC value, STEP 416. Processing then returns to the instruction after the STR instruction to continue executing with the obtained TOC value, STEP 418.

Figure 5:
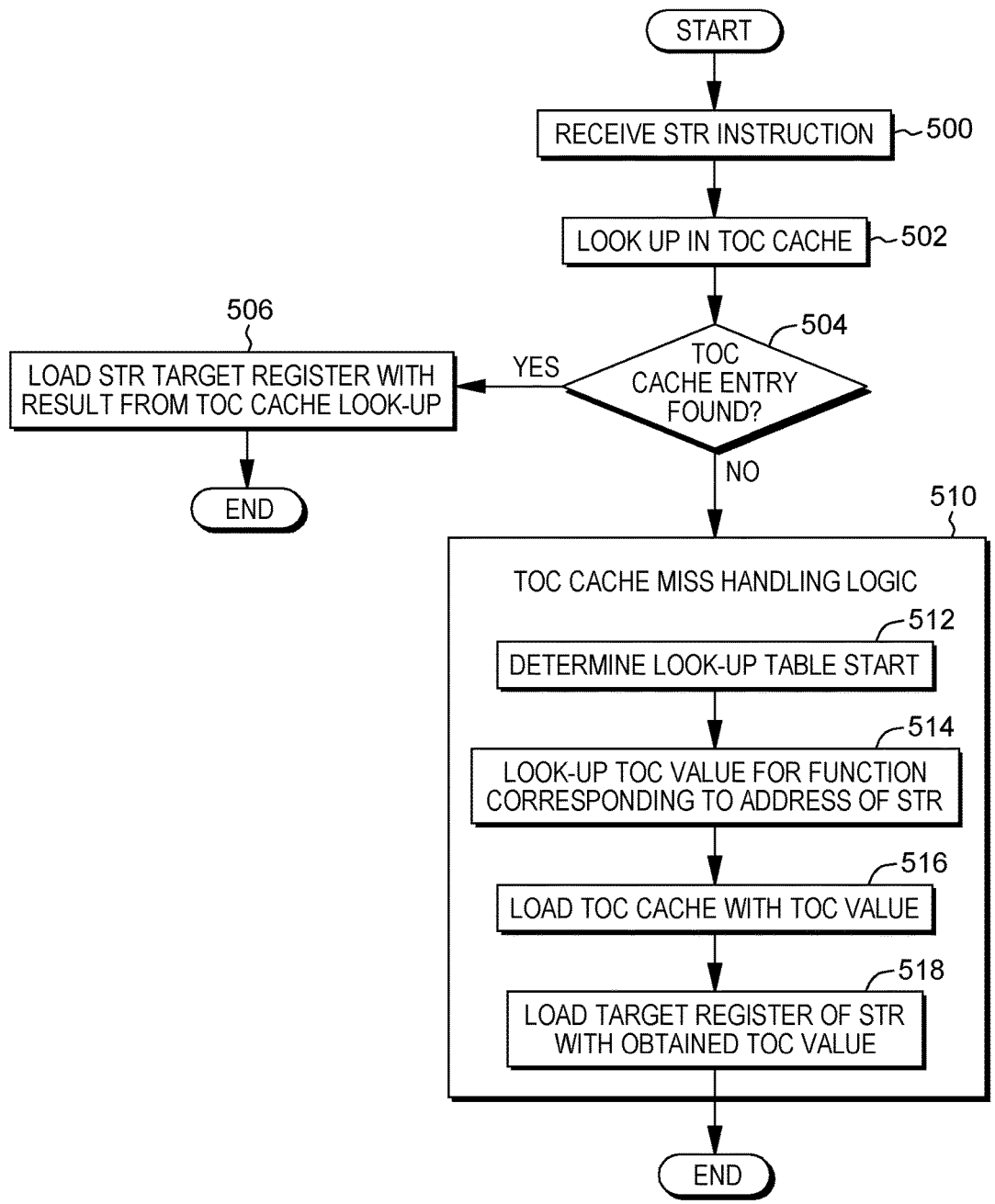
FIG. 5 depicts yet another example of processing associated with a Set TOC Register instruction, in accordance with an aspect of the present invention.

A further implementation is described with reference to FIG. 5, in which hardware performs the processing. Referring to FIG. 5, an STR instruction is received, STEP 500, and a TOC cache look-up is performed to locate the TOC value for the function that includes the STR instruction, STEP 502. A determination is made as to whether a TOC cache entry for the function is found, INQUIRY 504. If the TOC cache entry is found, then the STR target register is loaded with the result from the TOC cache look-up, STEP 506. However, if the TOC cache entry is not found, then TOC cache miss handling logic is performed, STEP 510. This includes, for instance, determining a look-up table start, STEP 512, and looking up in one or more tables or other data structures the TOC value for the function corresponding to the address of the STR, STEP 514. The TOC cache is loaded with the found TOC value (e.g., address), STEP 516, and the target register of the STR is loaded with the obtained TOC value, STEP 518.

In one or more of the above examples, the TOC cache may be implemented in a number of ways. For instance, it may include a pair (STR address, returned value) associating a value to return for the address of each STR instruction, or it may include a range of addresses of STR instructions for which to return a specified value, since adjacent functions typically share a TOC, e.g., storing a triple (from_range, to_range, returned value) in a table. Further details regarding TOC caches are described below.

Although in the above-described embodiments, the STR is used to load a TOC value, the STR may also be used to load other values, such as a magic number (e.g., identifier in, e.g., the Executable and Linkable Format (ELF)), or other values, e.g., those which may be associated with a region of code, specific modules, or particular instruction addresses of an STR instruction. Many possibilities exist.

In a further aspect, code is scanned looking for instruction sequences that set the value of a TOC register and those instruction sequences are replaced with a Set TOC Register instruction. In yet a further aspect, a verification instruction is provided to verify prediction of the value of the TOC register. As examples, an instruction sequence includes one or more instructions.

In accordance with conventional code generation techniques, TOC values are often computed using a sequence of instructions, or loaded from the stack.

For instance, a TOC value may be computed using a sequence such as:

| | | |
|---|---|---|
| addis | r2, r12, offset@h | // add immediate shift; r12 is the<br>// beginning of the function; r2<br>// is a register to hold the TOC<br>// value; high order bits of offset<br>// are added to the beginning of<br>// the function and the result is<br>// placed in r2 |
| addi | r2, r2, offset@l | // add immediate; add the lower<br>// order bits of the offset to the<br>// value in r2; place the result in r2 |

In another example, a TOC value is loaded (ld) from memory (e.g., a stack):

| | | |
|---|---|---|
| ld | r2, sp, <stackoffset for TOC> | // sp is stack pointer |

These sequences commonly involve interlocks (e.g., need to wait on a previous store instruction directed at storing the TOC value to complete), before they may complete. This type of interlock commonly results in performance degradation. Thus, in accordance with an aspect of the present invention, a processor instruction decode unit recognizes TOC-setting instructions and/or TOC-setting instruction sequences and replaces them with an STR instruction. Optionally, a verification instruction is also provided. As used herein, a TOC-setting instruction and/or TOC-setting instruction sequence includes one or more instructions used to set a TOC register or compute a TOC pointer value.

For example, in one embodiment, the following instruction sequence is recognized by the processor (e.g., the instruction decode unit of the processor):

| | |
|---|---|
| addis | r2, r12, offset@h |
| addi | r2, r2, offset@l | and the sequence is replaced with the following operations to load a (predicted) TOC value and verify the prediction by comparing it to the sum of the register r12 and offset used in the original code to compute r2:

| |
|---|
| STR r2 |
| verify r2, r12, offset |

In a further example:

| | |
|---|---|
| ld | r2, sp, <stackoffset for TOC> | is replaced with:

| |
|---|
| STR r2 |
| load-verify r2, sp, <stackoffset> |

Examples of the STR instruction are described above, and further details regarding using the verify operations are described below. For instance, further details associated with using an STR verify internal operation (iop), e.g., verify rx, ry, offset, are described with reference to FIG. 6A.

Figure 6A:
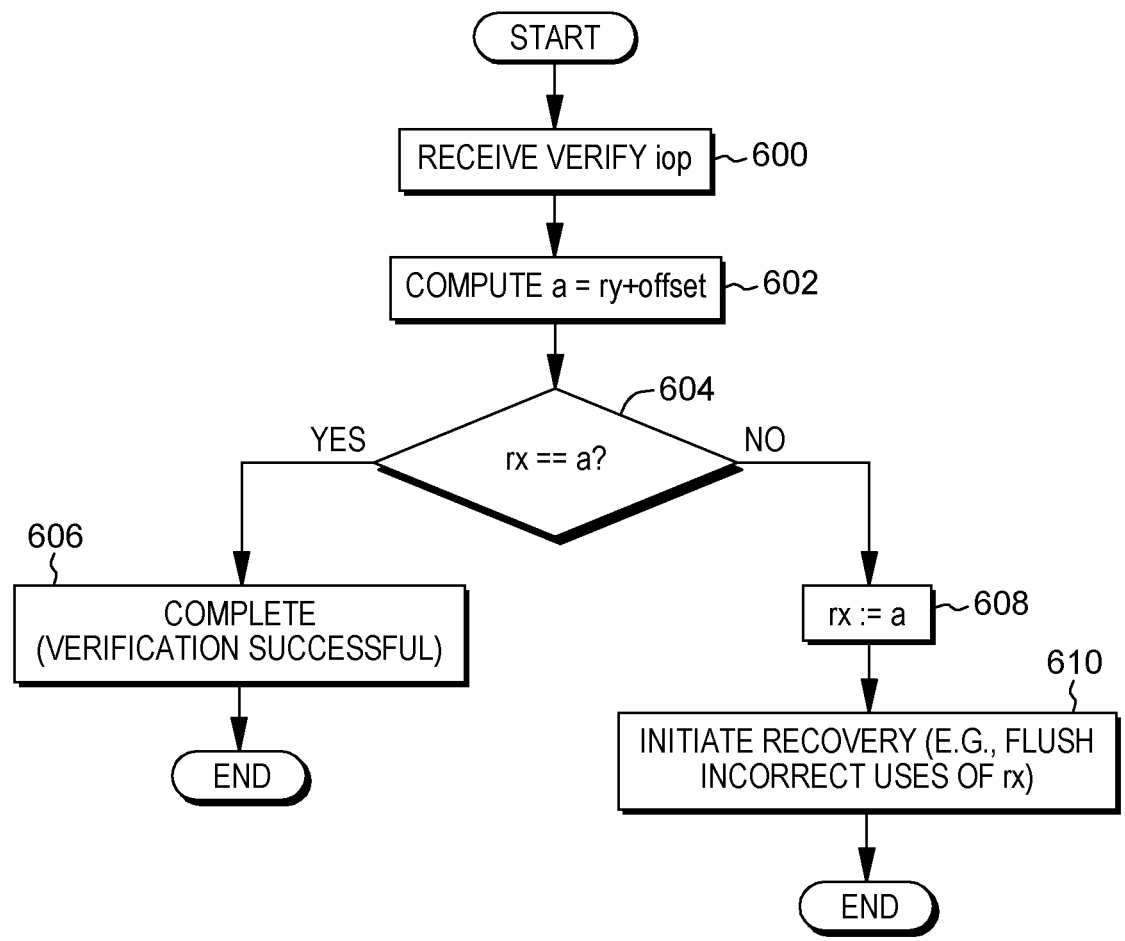
FIGS. 6A-6B depict embodiments of verifying the setting of a TOC register (also referred to herein as a TOC pointer register), in accordance with an aspect of the present invention.

Referring to FIG. 6A, a verification technique, performed by, e.g., a processor, is described. Initially, a verify internal operation (e.g., an internal operation verify rx, ry, offset with two example register operands and an immediate number operand—such as the example verify r2, r12, offset in the example code hereinabove) is received, STEP 600. A variable a is computed by adding the offset of the verify operation to a value of base register ry of the verify internal operation (e.g., r12), STEP 602. A determination is made as to whether a value in the target register, rx of the verify internal operation (e.g., r2), is equal to the computed value, a, INQUIRY 604. If the value of rx is equal to the computed value, a, the verification is complete, STEP 606, and successful.

However, if the value of rx is unequal to a, then a is assigned to the target register rx, STEP 608, and recovery is initiated, STEP 610. Recovery includes, for instance, flushing incorrect uses of rx from the instruction pipeline after the present instruction or flushing all instructions in the pipeline after the present instruction. Other variations are also possible.

Figure 6B:
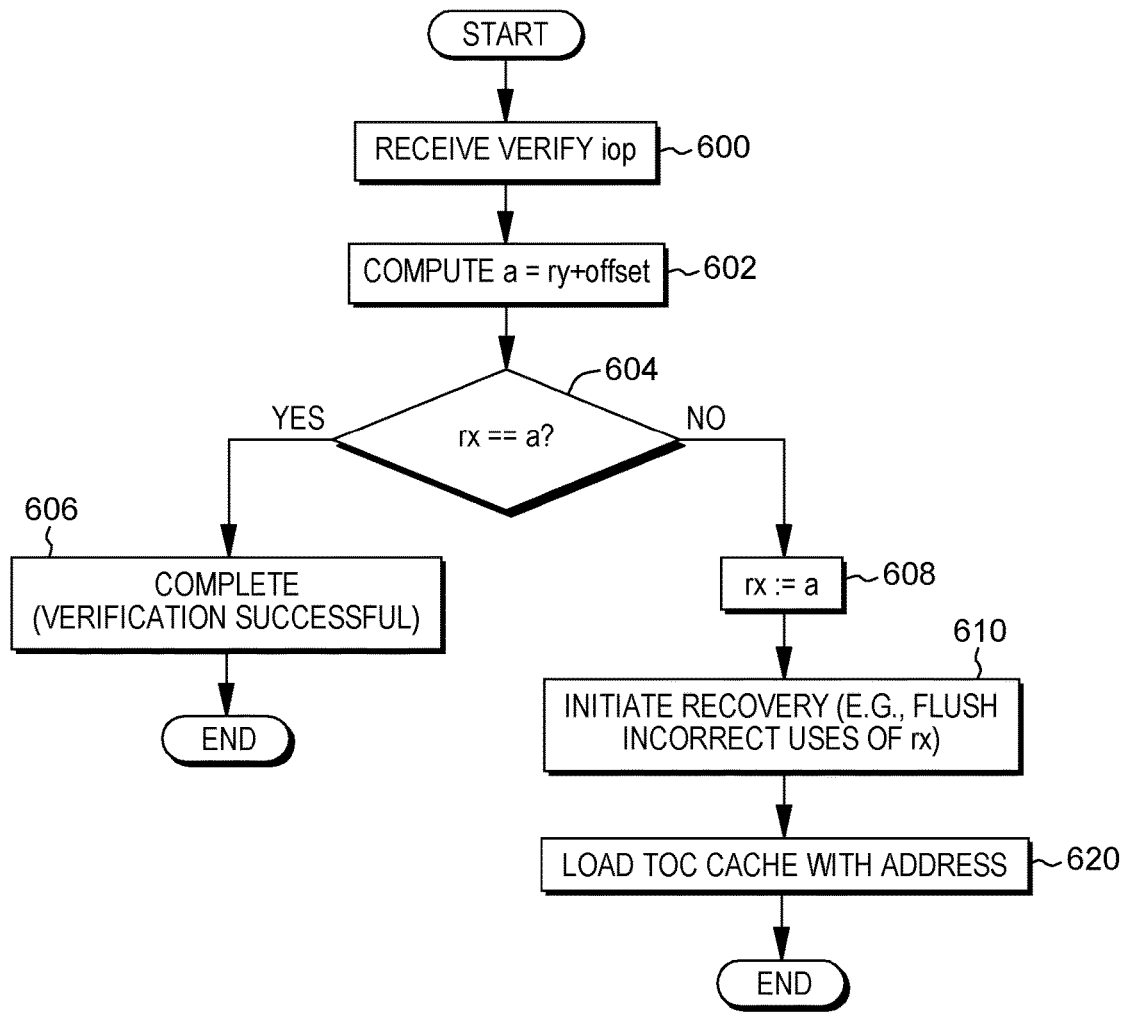

In a further embodiment, as shown in FIG. 6B, the computed value (e.g., the TOC pointer; a.k.a., the TOC pointer address or address) is loaded in the TOC cache, STEP 620.

Figure 7A:
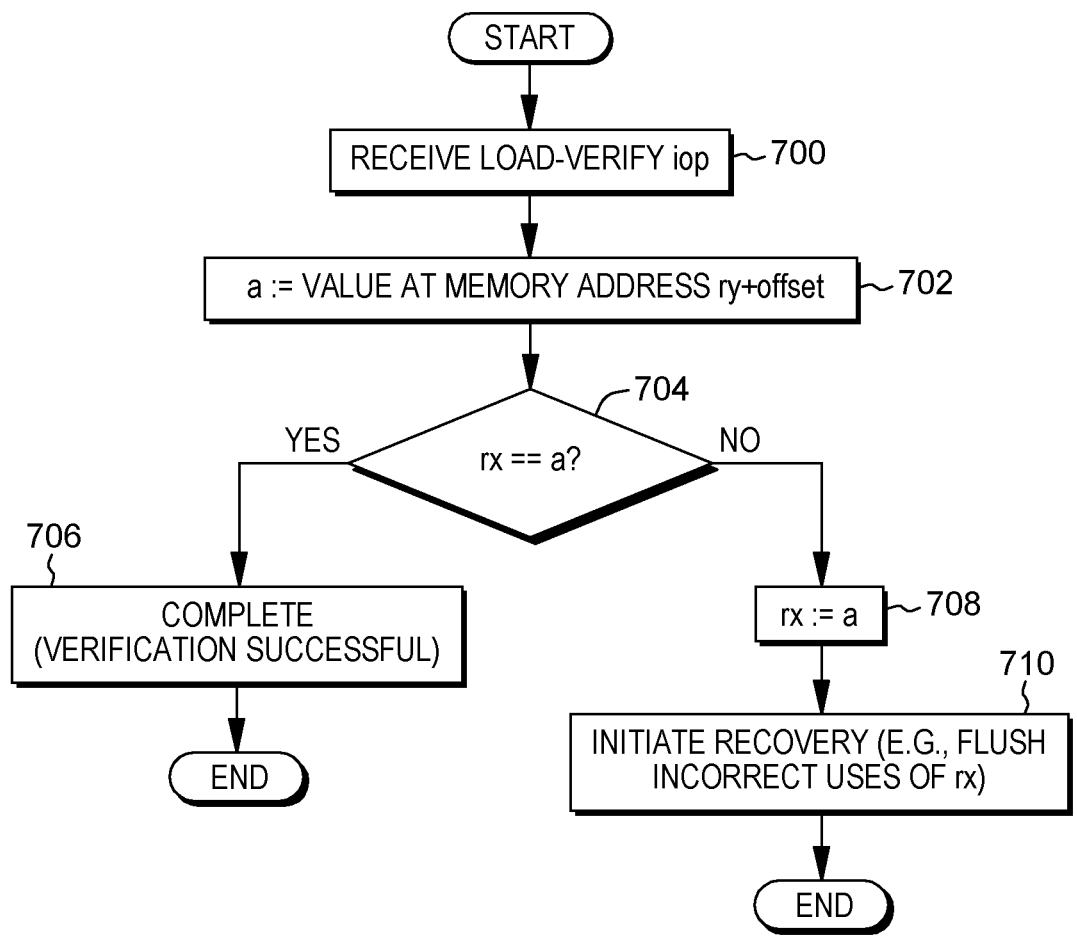
FIGS. 7A-7B depict other embodiments of verifying the setting of the TOC register, in accordance with aspects of the present invention.

Other examples of verification techniques performed, e.g., by a processor, are described with reference to FIGS. 7A-7B. Referring to FIG. 7A, in one example, a load-verify internal operation is received, STEP 700. A value for a variable a is computed. For instance, a value at the memory address ry (i.e., at the stack pointer) plus an offset is assigned to variable a, STEP 702. A determination is made as to whether the value of a base register rx (e.g., r2) is equal to a, INQUIRY 704. If the value in rx is equal to the computed value a, then the verification is complete and successful, STEP 706. However, if the computed value a is not equal to the value in rx, then a is assigned to rx, STEP 708. Further, recovery is initiated, STEP 710. Recovery includes, for instance, flushing the incorrect uses of rx or flushing all instructions in the pipeline after the present instruction. Other variations are possible.

Figure 7B:
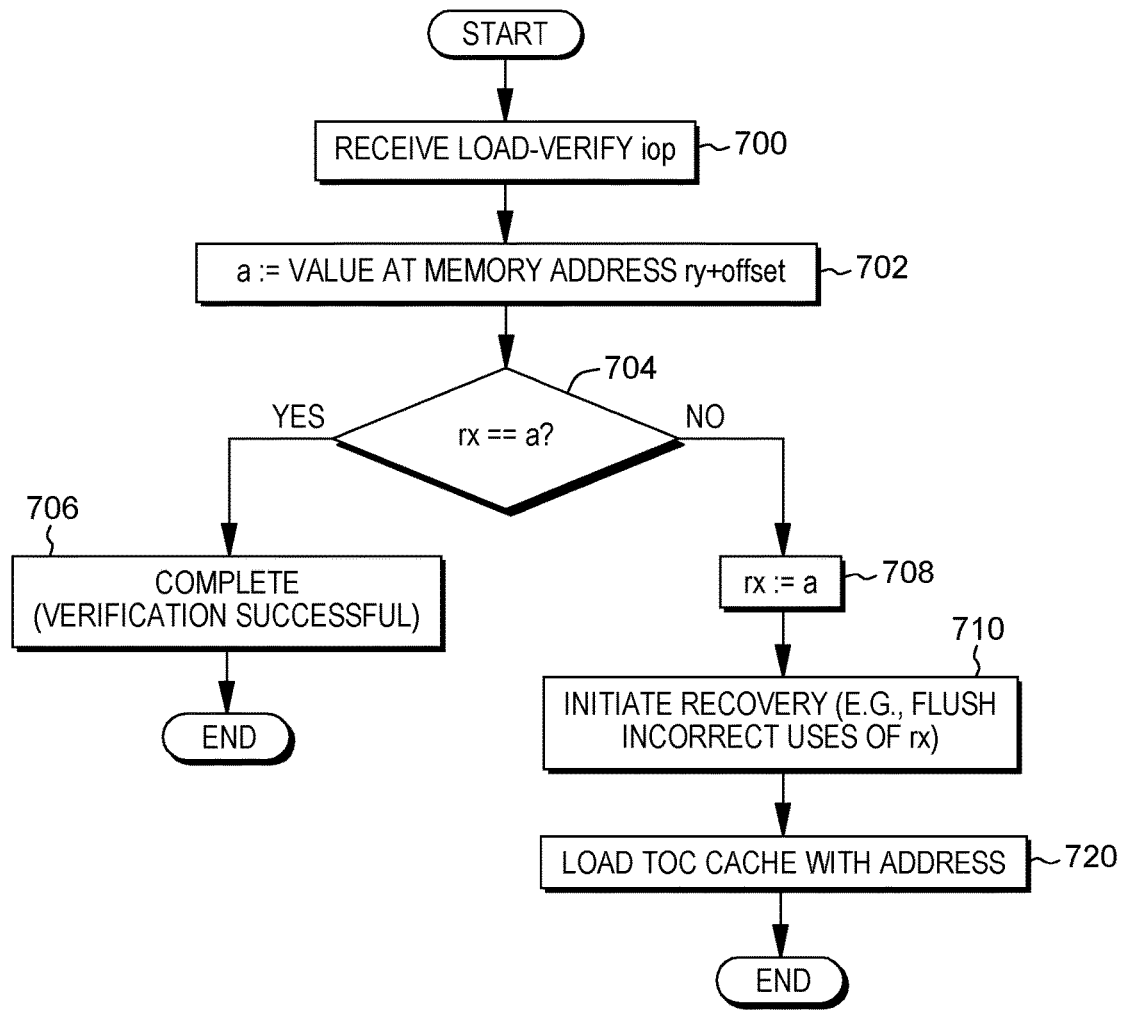

In another embodiment, with reference to FIG. 7B, the computed value (e.g., the TOC pointer or address) is loaded into the TOC cache, STEP 720.

Figure 8:
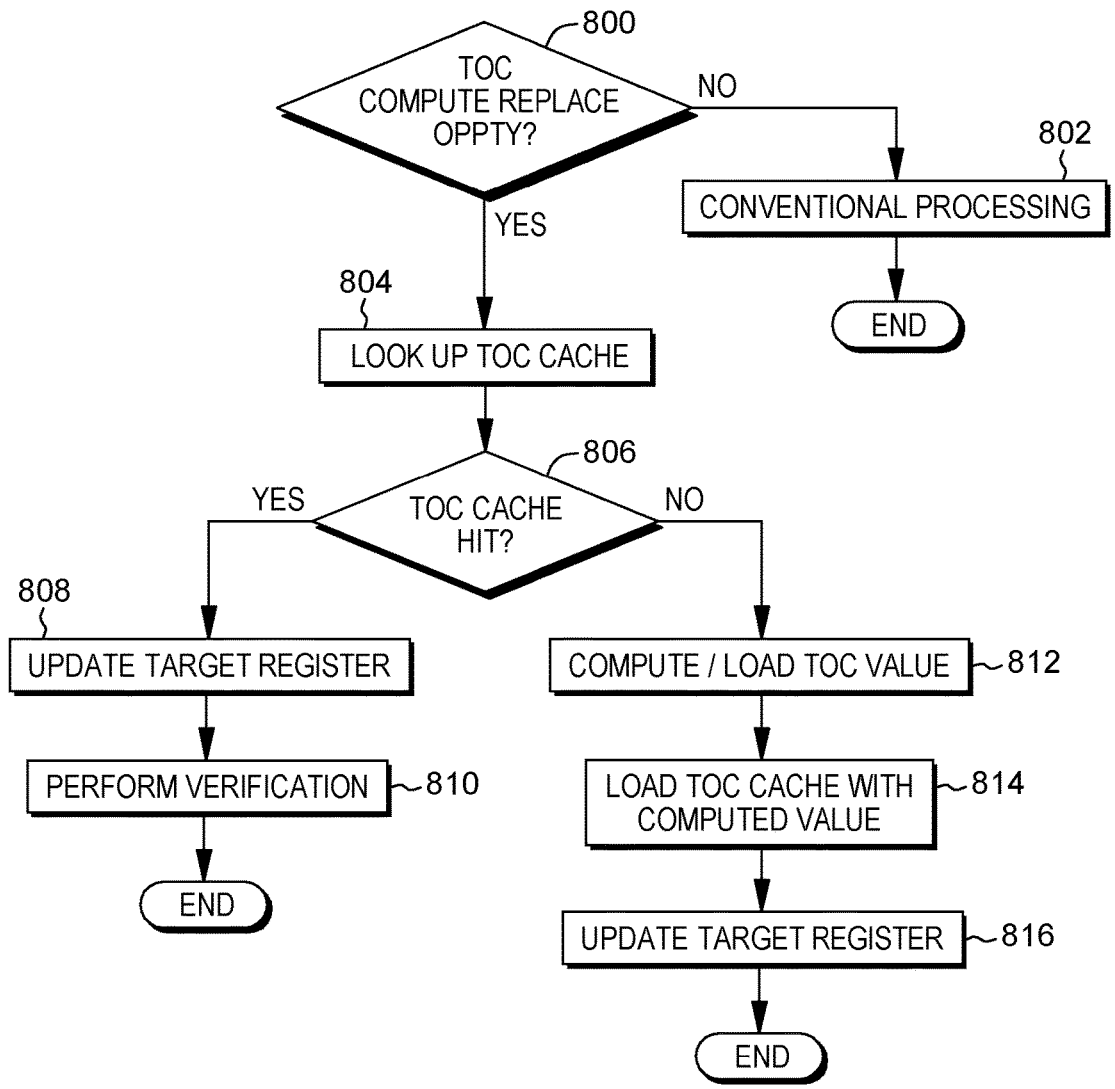
FIG. 8 depicts one embodiment of determining a TOC pointer value (also referred to herein as a TOC value), in accordance with an aspect of the present invention.

In a further embodiment, different execution paths may be taken depending on whether the TOC value is in the TOC cache. One example of this processing is performed by e.g., a processor, and is described with reference to FIG. 8. Initially, a determination is made as to whether there is an opportunity to replace instruction sequences used to determine the TOC value (e.g., an opportunity to fuse multiple instructions into an iop sequence), INQUIRY 800. That is, is there an opportunity to replace sequences of instructions with an STR, and optionally, a verify, or to perform some other replacement of instructions? If not, then conventional processing is performed to determine the TOC value (e.g., using the sequence of instructions addis/addi or a load instruction), STEP 802. However, if there is a TOC value replace opportunity, then a look-up is performed in the TOC cache to determine whether a value for the routine including the STR is there, STEP 804. If there is a TOC cache hit, then the target register of STR is updated with the TOC value, STEP 808. Further, verification is performed, in one example, STEP 810. However, returning to INQUIRY 806, if there is not a TOC cache hit, then the TOC value is generated either by a sequence of compute instructions (e.g., addis, addi) or a load instruction, as examples, STEP 812. The computed value is loaded into the TOC cache, STEP 814, and the target register is updated, STEP 816.

Other implementations and variations are also possible.

In a further aspect, the TOC value is predicted based on entering a subroutine. For instance, when a subroutine call is performed, the TOC value is predicted, rather than waiting to find a sequence of instructions that is believed to compute the TOC value. Instead, the TOC value is predicted upon entering the subroutine, and then, when the sequence of instructions in the called routine that computes the TOC value is encountered, it is replaced by a TOC checking instruction (i.e., an instruction that checks or verifies the predicted TOC value). If the TOC checking instruction fails, or a TOC value is accessed without the prediction having been checked, recovery may be performed.

As one example, the processor predicts the value of the TOC register (e.g., r2) for a subroutine based on previously observed addresses. The predicted TOC value is entered into a target address register array in conjunction with a predicted target address or in a separate TOC prediction array, as examples.

In particular embodiments, the TOC value may be predicted using, for instance, the hardware-assisted technique described with reference to FIG. 4, and/or the hardware technique described with reference to FIG. 5. In a further embodiment, the TOC value is obtained by using the sequence of instructions in legacy code to compute the TOC value and initializing the TOC cache. Other possibilities also exist.

Figure 9:
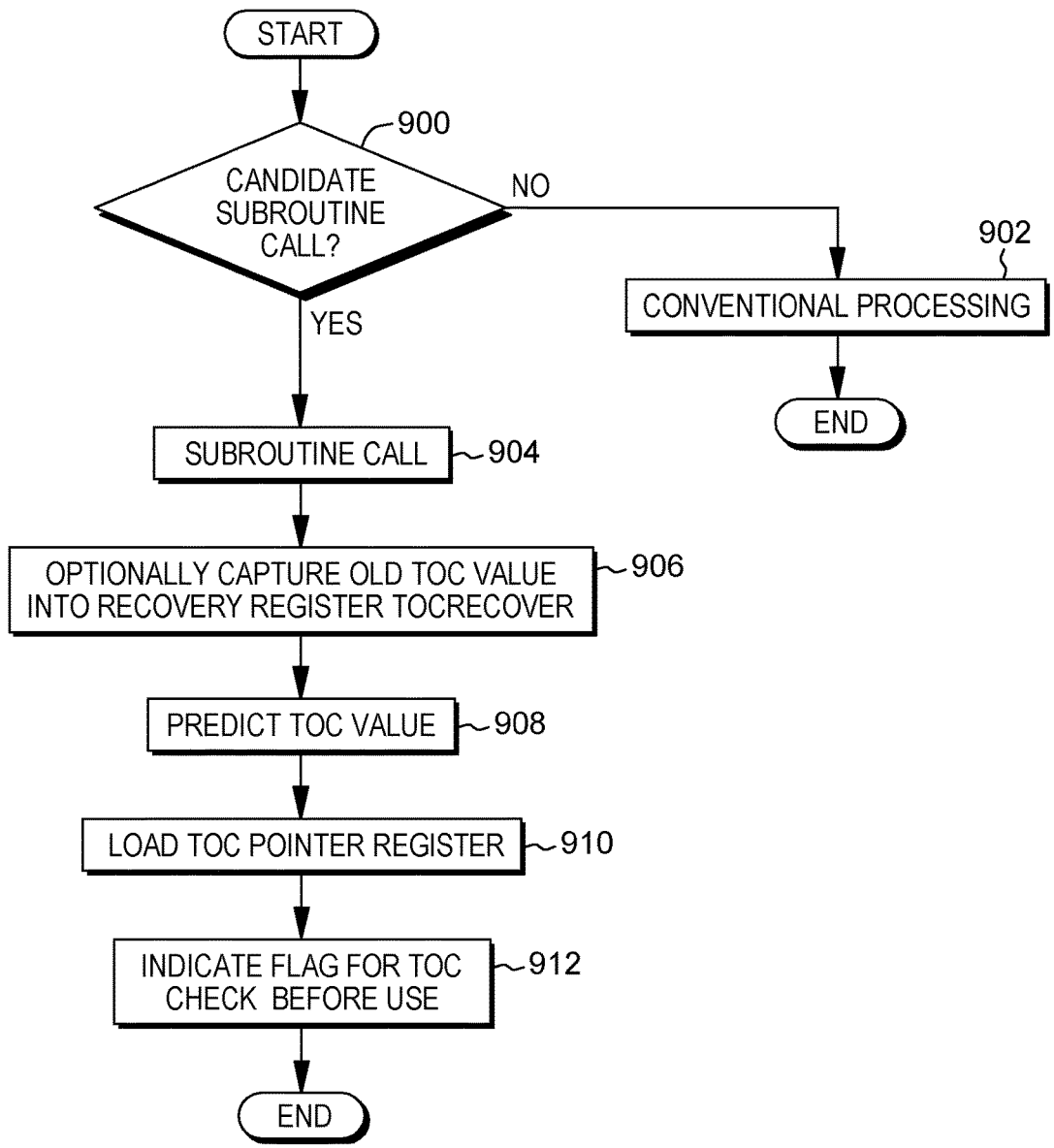
FIG. 9 depicts one example of processing associated with predicting a TOC value responsive to a subroutine branch, in accordance with an aspect of the present invention.

One embodiment of predicting the TOC value based on a subroutine branch is described with reference to FIG. 9. This processing is performed by, e.g., a processor. Referring to FIG. 9, initially, a determination is made as to whether the subroutine call is a candidate for predicting the TOC value, INQUIRY 900. For instance, is the subroutine call a register-indirect branch (in which a location of the address of the next instruction to execute is specified in a branch instruction, instead of the address itself)? In other embodiments, branches other than local-module functions are considered candidates, or filters or other mechanisms may be provided to determine candidacy. If not, then conventional processing is performed, STEP 902. However, if the subroutine call is a candidate for predicting the TOC value, then the subroutine call is performed, STEP 904. This call may be coupled with prediction of other types of values, in addition to the TOC value. Additionally, the old TOC value is saved in, for instance, a recovery location, such as a register, TOCRECOVER, STEP 906. Further, the TOC value is predicted, STEP 908. Various techniques may be used to predict the TOC value, as described herein. The predicted TOC value is then loaded into a TOC pointer register (e.g., r2), STEP 910. The identification of the TOC register may be hardcoded or may be configured, as examples. Further, in one example, a flag or other indicator maintained in a selected location is set (e.g., to 1) to indicate a TOC check (e.g., a check of the TOC value) is to be performed before use of the TOC value, STEP 912.

Figure 10:
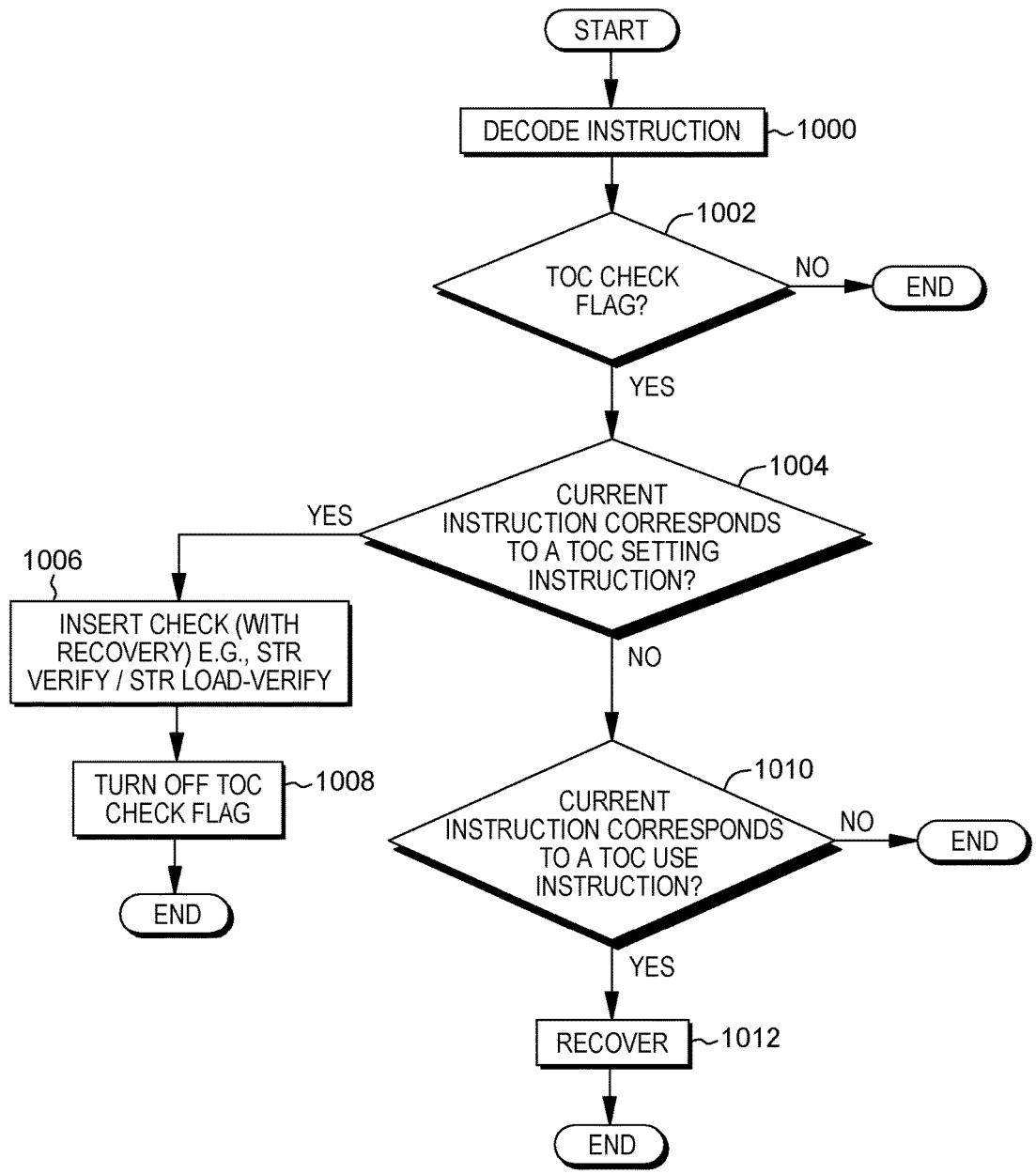
FIG. 10 depicts one example of TOC value check insertion logic, in accordance with an aspect of the present invention.

Further details regarding a TOC check, and in particular, insertion logic for the TOC check, are described with reference to FIG. 10. In one example, this logic is integrated in the decode unit. Initially, an instruction is obtained and decoded, STEP 1000. A determination is made as to whether the TOC check flag is set, INQUIRY 1002. If it is not set, then this processing is complete. However, if the TOC check flag is set (e.g., set to 1), then a further determination is made as to whether the current instruction corresponds to a TOC setting instruction (e.g., a sequence of one or more instructions to set (e.g., load, store, provide, insert, place) the TOC value in, e.g., a TOC register; e.g., a load instruction, or a sequence of instructions to compute the TOC value), INQUIRY 1004. If the current instruction corresponds to a TOC setting instruction, then the TOC check is inserted in the code, STEP 1006. For instance, an STR verify or an STR load-verify instruction replaces the one or more instructions in the code used to compute the TOC value. The parameters of a verify instruction are, e.g., derived from the compute sequences being replaced, e.g., based on the examples shown hereinabove. Thus, an instruction sequence based on computation instructions may be replaced with a verify instruction computing the address similar to the computational instruction(s), e.g., replacing one or more add instructions with a verify computing the instruction using corresponding additions; and load instructions may be replaced with load-verify instructions obtaining the value to be compared against from the same location(s) wherefrom a replaced load instruction would have loaded a TOC register. Additionally, the TOC check flag is turned off (e.g., set to 0), STEP 1008.

Returning to INQUIRY 1004, if the current instruction does not correspond to a TOC setting instruction, then a further determination is made as to whether the current instruction corresponds to a TOC use instruction (i.e., one or more of instructions to use the TOC value or TOC register), INQUIRY 1010. If not, then processing is complete. Otherwise, recovery may be performed, STEP 1012. In one embodiment, this can be accomplished by copying the value in TOCRECOVER back into the TOC register (e.g., r2). In another embodiment, register renaming may be used. In this embodiment, the predicted TOC value is stored in a new rename register, and during recovery, the new rename register is invalidated or the old TOC value is copied from another rename register to the new rename register. Other implementations and/or embodiments are also possible.

Figure 11:
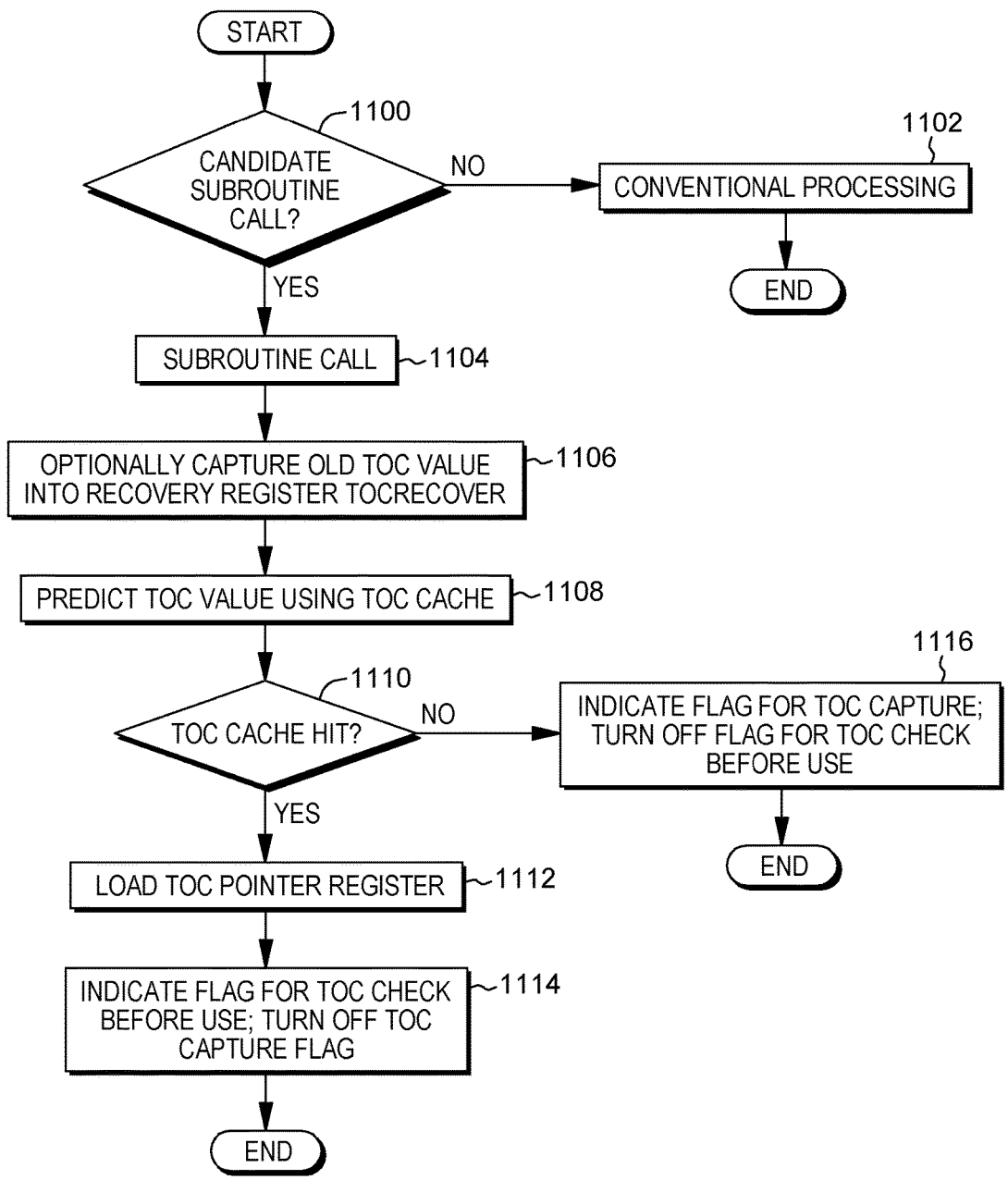
FIG. 11 depicts another example of processing associated with predicting a TOC value responsive to a subroutine branch, in accordance with an aspect of the present invention.

Another embodiment of predicting a TOC value based on a subroutine branch is described with reference to FIG. 11. This processing is performed by, e.g., a processor. Referring to FIG. 11, initially, a determination is made as to whether the subroutine call is a candidate for predicting the TOC value, INQUIRY 1100. In one embodiment, register-indirect branches are predicted. In other embodiments, module-local functions are excluded, and/or filters may further suppress candidate status, either based on an address called; or a caller address, callee address pair. Other possibilities also exist. If the subroutine call is not a candidate, then conventional processing is performed, STEP 1102.

Returning to INQUIRY 1100, if the subroutine call is a candidate for predicting the TOC value, then the subroutine call is made, STEP 1104. Optionally, other affiliated values may be predicted, in addition to the TOC value. Further, the old TOC value is saved in, for instance, a recovery register, TOCRECOVER, STEP 1106. Then, an attempt is made to predict the TOC value using the TOC cache, STEP 1108. A determination is made as to whether there was a TOC cache hit, INQUIRY 1110. If there was a TOC cache hit, then the obtained TOC value is loaded into the TOC pointer register (e.g., r2), STEP 1112. Further, a TOC check flag is set (e.g., to 1) indicating a TOC value check is to be performed prior to use of the predicted TOC value, and in one embodiment, a TOC capture flag located in a select location is turned off (e.g., set to 0), STEP 1114. Returning to INQUIRY 1110, if there is a TOC cache miss, then the TOC capture flag is set to indicate a TOC capture (e.g., set to 1) is to be performed to obtain the TOC value, and the TOC check flag is turned off (e.g., set to 0), STEP 1116. Other variations are also possible.

Figure 12:
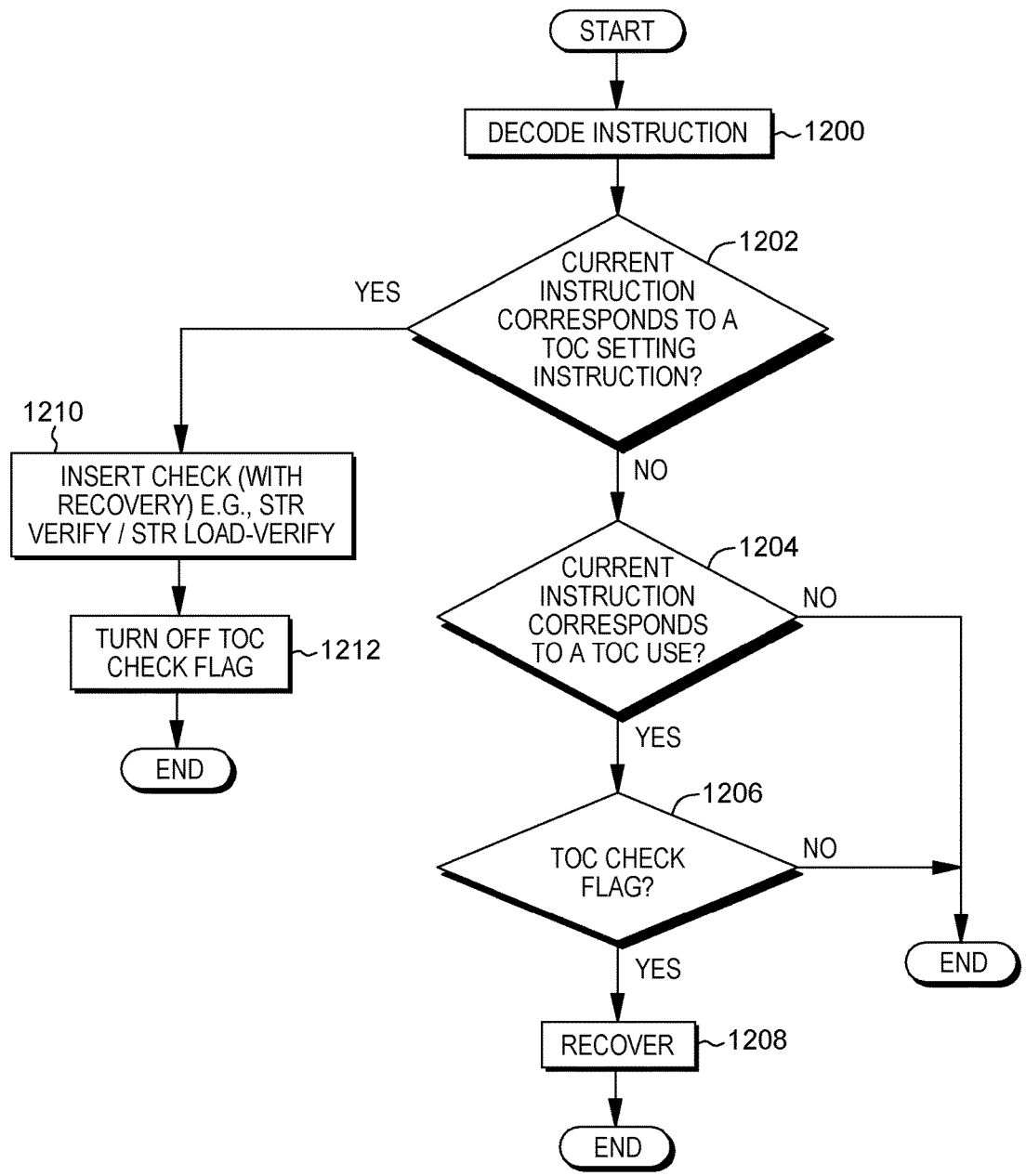
FIG. 12 depicts another example of TOC value check insertion logic, in accordance with an aspect of the present invention.

Details regarding check insertion logic for the embodiment of FIG. 11 are described with reference to FIG. 12. In one embodiment, this logic is integrated into the decode unit. Initially, an instruction is obtained and decoded, STEP 1200. A determination is made as to whether the current instruction corresponds to a TOC setting instruction, INQUIRY 1202. If it does not correspond to a TOC setting instruction, then a determination is made as to whether the current instruction corresponds to a TOC use instruction, INQUIRY 1204. If not, then processing is complete. Otherwise, a further determination is made as to whether the TOC check flag is set, INQUIRY 1206. If not, then again processing is complete. Otherwise, recovery may be performed, STEP 1208. In one embodiment, the recovery includes copying the value in the TOCRECOVER register back into the TOC register (e.g., r2) or using rename registers, as described above. Other variations are possible.

Returning to INQUIRY 1202, if the current instruction corresponds to a TOC setting instruction, then the check is inserted into the code, STEP 1210. For instance, an STR verify or an STR load-verify is inserted. The TOC check flag is then turned off (e.g., set to 0), STEP 1212.

Figure 13:
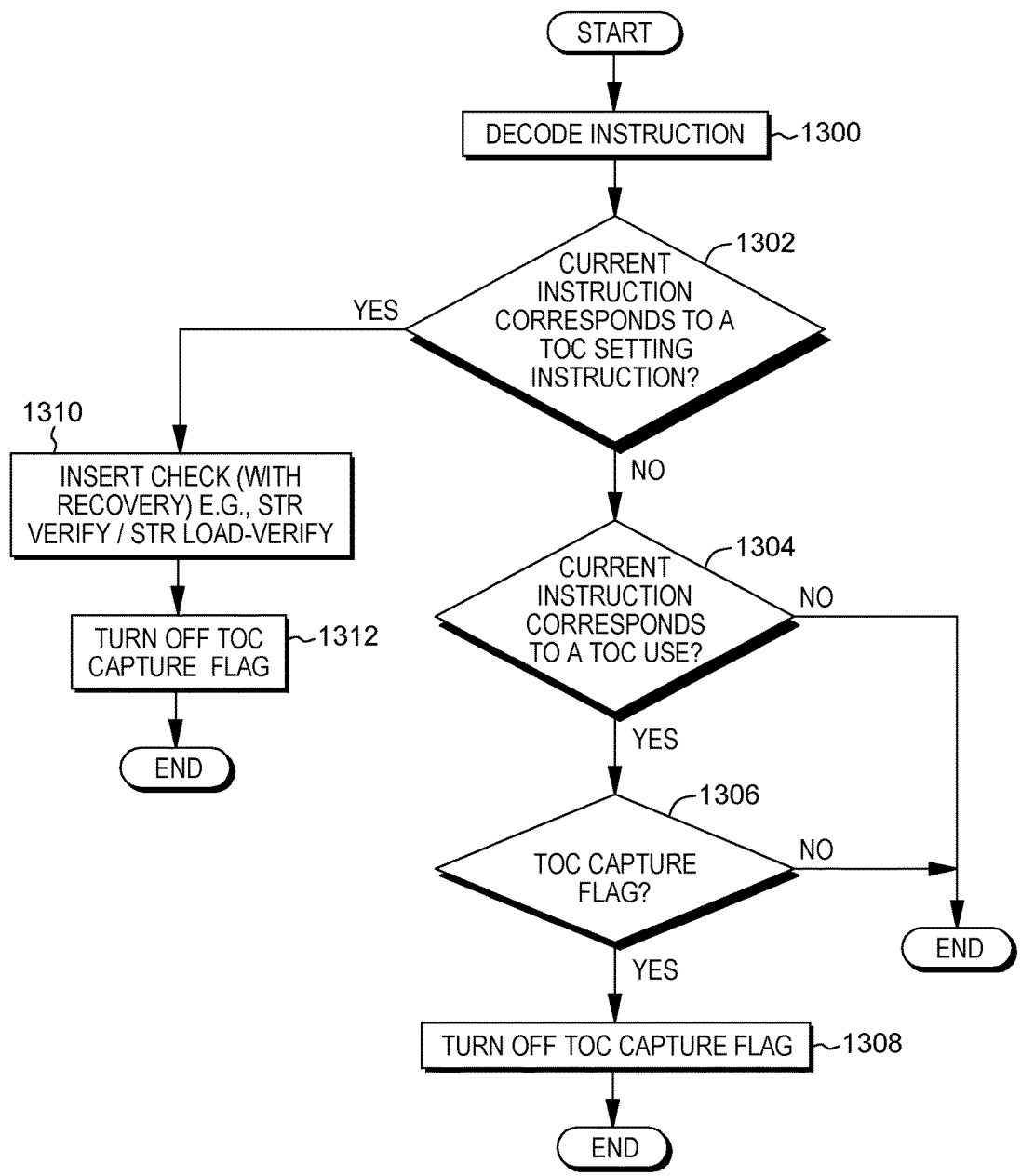
FIG. 13 depicts another example of TOC value check insertion logic, in accordance with an aspect of the present invention.

A further embodiment of TOC check insertion logic is described with reference to FIG. 13. In one example, this logic is integrated into the decode unit. Referring to FIG. 13, an instruction is obtained and decoded, STEP 1300. A determination is made as to whether the current instruction corresponds to a TOC setting instruction, INQUIRY 1302. If the current instruction does not correspond to a TOC setting instruction, then a further determination is made as to whether the current instruction corresponds to a TOC use instruction, INQUIRY 1304. If not, then processing ends. Otherwise, a determination is made as to whether the TOC capture flag is set, INQUIRY 1306. If not, then processing is complete. Otherwise, the TOC capture flag is turned off (e.g., set to 0), STEP 1308. In one embodiment, it can be recorded that this function does not load a new TOC value in the TOC cache, or a filter is indicated (e.g., Bloom filter) to suppress TOC prediction with the TOC cache. Other variations are also possible.

Returning to INQUIRY 1302, if the current instruction does not correspond to a TOC setting instruction, then the check is inserted, which in one example includes a verify instruction that triggers recovery actions, STEP 1310, and the TOC capture flag is reset (e.g., set to 0), STEP 1312.

In one embodiment, the processing associated with the TOC check flag and the TOC capture flag may be performed, and in one example, they may be performed in parallel.

Further details regarding a TOC cache are now described with reference to FIG. 14A. In one example, a TOC cache 1400 includes a plurality of columns, including e.g., a TOC setter address column 1402, a TOC value column 1404 that includes the TOC value for the module of that entry, an optional function initializes TOC column 1406, and an optional usage tracking column 1408. TOC setter address column 1402 includes a TOC setter address, such as the address of the STR, the function begin, or a number of other values, based on specific use cases. In one or more embodiments, there are provided set associative tables that are accessed by TOC setter addresses. The FUNC inits TOC column 1406 may be used to capture functions that do not initialize a TOC register. In another embodiment, using a table entry is too expensive, and a filtering mechanism, e.g., a Bloom filter, or other filter mechanisms may be used to identify functions for which a TOC value should not be predicted. Usage tracking provides a way of selecting an entry to be removed when the table is full and another entry is to be used. A variety of tracking schemes may be used, including, for instance, least recently used, least frequently used, FIFO (first in, first out), number of uses per time period, etc. In at least one embodiment, column 1408 is adapted to store usage information commensurate for storing the appropriate information for an implemented replacement policy.

Figure 14B:
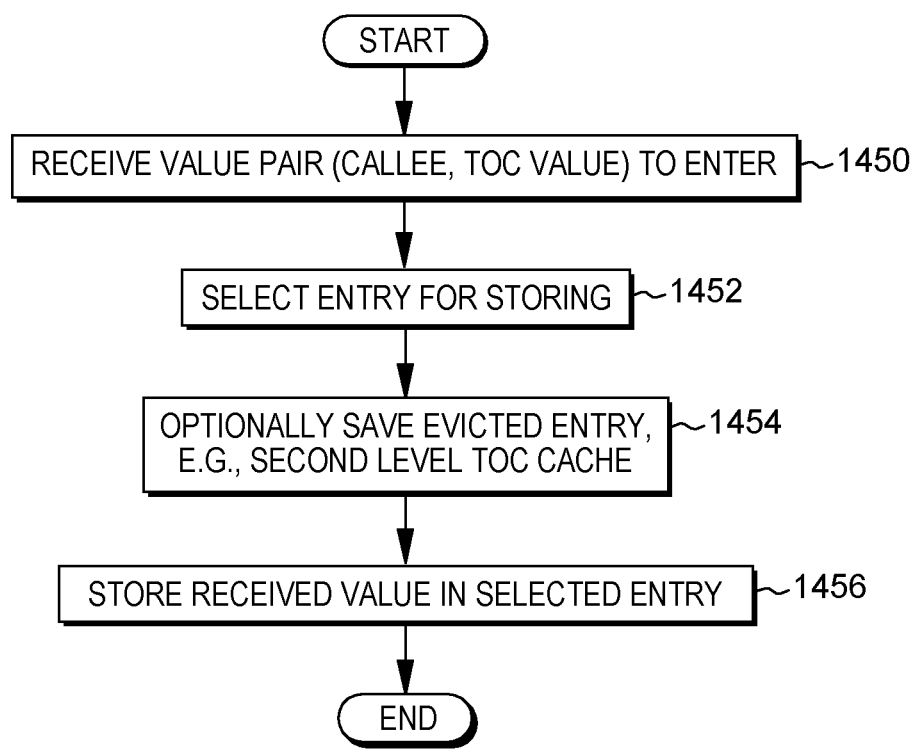
FIG. 14B depicts one example of TOC cache insertion processing, in accordance with an aspect of the present invention.

One embodiment of inserting an entry into the TOC cache is described with reference to FIG. 14B. Initially, a value pair (e.g., callee, TOC value) to be entered into the TOC cache is received, STEP 1450. An entry in the cache is selected for storing the value pair, STEP 1452. As examples, index bits may be used to select the entry or the usage tracking information may be used. Optionally, in one embodiment, if an entry is to be evicted, the evicted entry is saved, e.g., to a second level TOC cache, STEP 1454. The obtained value pair is stored in the selected entry, STEP 1456. Other variations are possible.

In one embodiment, a single TOC pointer value corresponds to an entire module, i.e., all functions in a module have the same TOC pointer value. Therefore, in accordance with an aspect of the present invention, the processor stores a TOC value in a TOC cache for a range of addresses. As an example, the range of addresses corresponding to the same TOC pointer value is dynamically determined, e.g., by coalescing newly discovered values of the TOC with pre-existing ranges. In a further embodiment, the extent of the ranges is provided by the dynamic loader, and a predicted TOC value is associated with the value of the range. Other examples are also possible.

As a further example, the TOC may cover a portion of a module, and then, the range of addresses would be the range of that portion. Other variations also exist.

The TOC cache may be used, as described above, but in this aspect, the TOC cache has a different format than in FIG. 14A, and therefore, different management. This enables a more compact and efficient representation of a TOC cache, which takes advantage of the TOC value properties.

Figure 15:
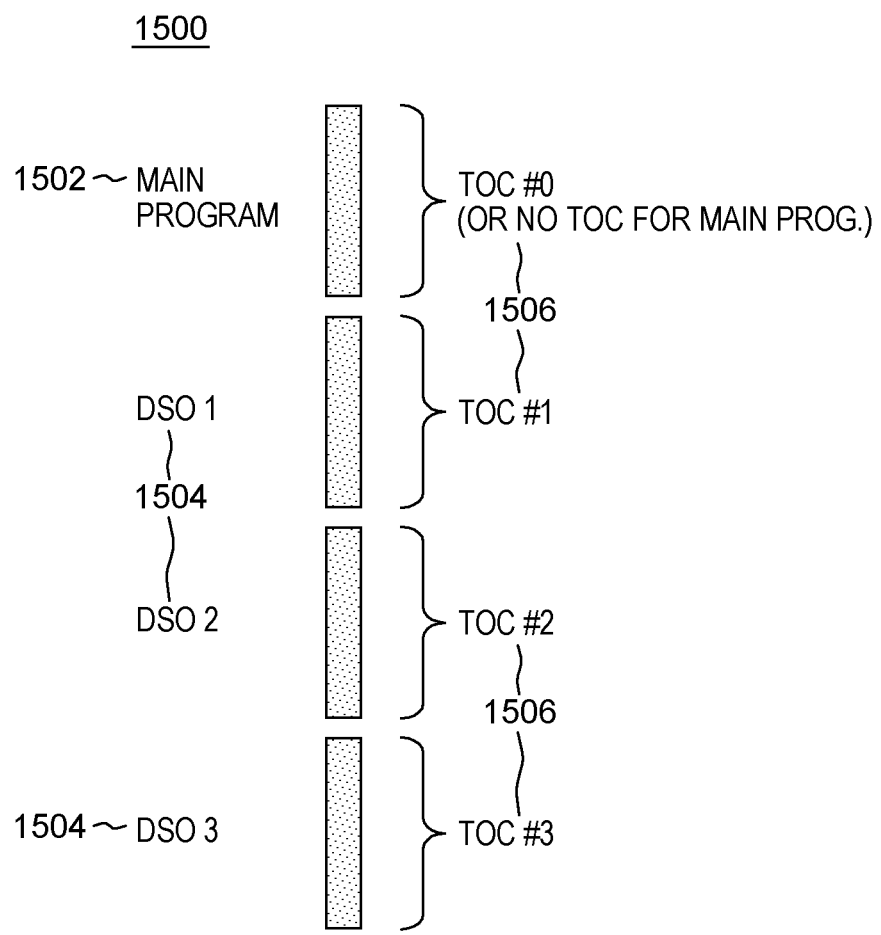
FIG. 15 depicts one example of TOC values assigned to dynamically shared objects, in accordance with an aspect of the present invention.

As shown in FIG. 15, in one example, an application 1500 may include a plurality of modules, including a main program 1502 and one or more dynamically shared objects (DSOs) 1504, such as shared libraries. Each module has associated therewith a TOC value 1506, which corresponds to code in the address range to which that module has been loaded, e.g., by the dynamic loader. Since each module may have its own TOC value associated therewith, the TOC cache may be implemented indicating such. For instance, as shown in FIG. 16, a TOC cache 1600 includes, for instance, a TOC range address_from column 1602 and a TOC range address_to column 1604. TOC range address_from column 1602 shows the start of a particular module for a TOC value, and TOC range address_to column 1604 shows the end of that particular module for the TOC value. For that module, a TOC value is included in a TOC value column 1606. Further, the TOC cache may include a usage tracking column 1608. Other and/or different columns are also possible.

Figure 17:
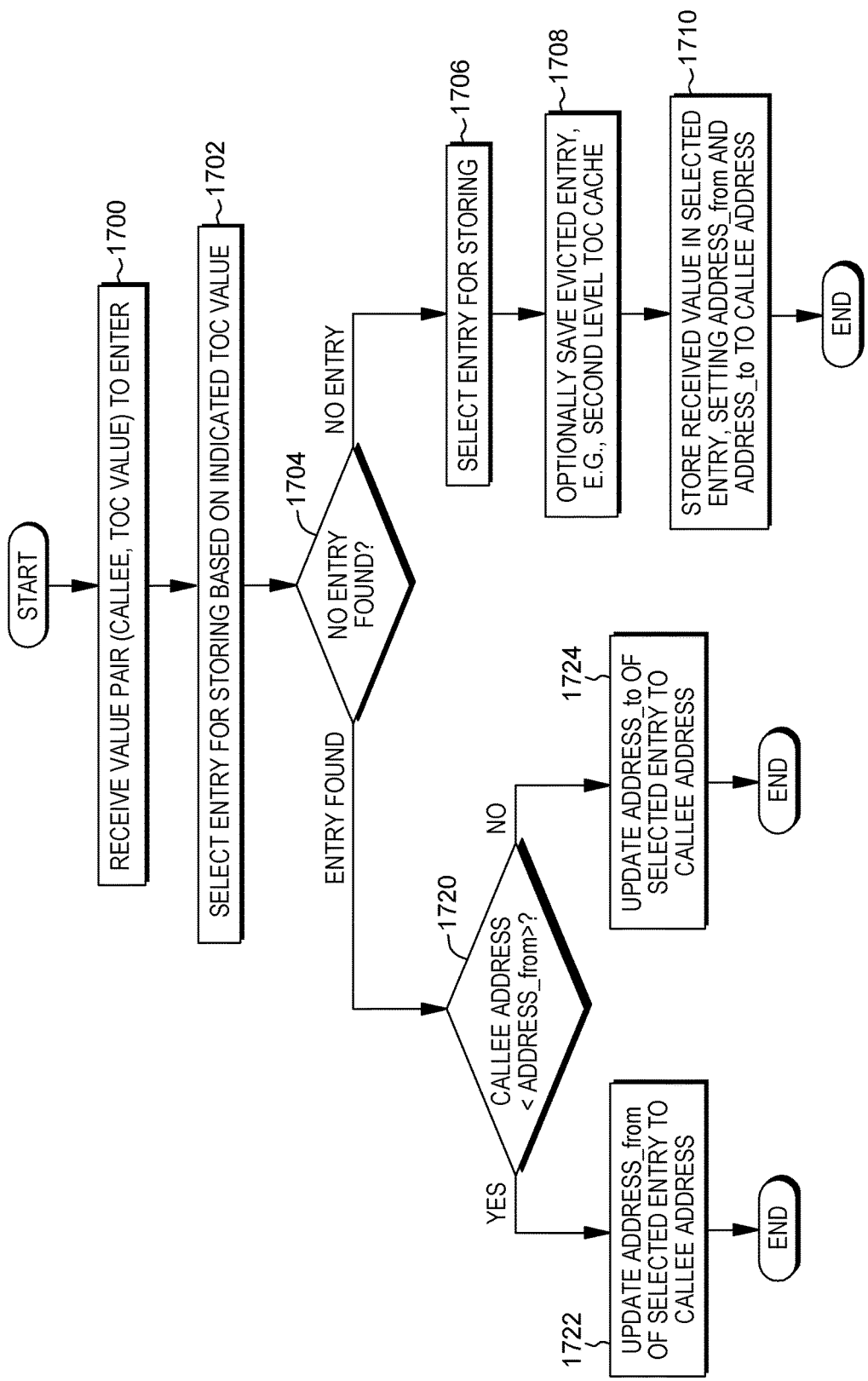
FIG. 17 depicts another example of TOC cache insertion processing, in accordance with an aspect of the present invention.

One embodiment of inserting an entry in such a TOC cache is described with reference to FIG. 17. This logic is performed by, for instance, the processor. A value pair (e.g., callee, TOC value) to be inserted into the cache is received, STEP 1700. An attempt is made to select an entry for storing the TOC value based on the indicated TOC value, STEP 1702. A determination is made as to whether an entry is found in the TOC cache for the TOC value, INQUIRY 1704. If no entry is found, then an entry within the TOC cache is selected for storing the TOC value, STEP 1706. This entry may be an empty entry or it may be an entry that has other information. If there is already a value in the entry to be used, then that information may be saved, for instance, in a second level TOC cache, STEP 1708. The received value is then stored in the selected entry, STEP 1710. Additionally, the address_from and address_to columns are set to the callee address.

Returning to INQUIRY 1704, if an entry is found, then a determination is made as to whether the callee address is less than the address in the address_from column, INQUIRY 1720. If the callee address is less than the address_from column, then the address_from column of the selected entry is updated to the callee address, STEP 1722. Otherwise, the address_to column of the selected entry is updated to the callee address, STEP 1724.

The above flow assumes one entry per TOC value such that there are not multiple entries found. However, if multiple entries could be found for a particular module, then a check for such would be made.

In a further embodiment, candidate selection for TOC prediction may use the TOC table with ranges to determine whether a call to the same module is performed to suppress TOC prediction. Other variations are possible.

In a further aspect, a TOC tracking structure is prepared and initialized for TOC prediction. As one example, a linker links a program and the linker determines a TOC value, either an absolute value for a module or a relative offset, e.g., relative to a module load address. The dynamic loader loads the module and computes the final TOC value. The dynamic loader then loads the TOC value into a TOC tracking structure to be used in connection with, for instance, the Set TOC Register instruction or another predictive instruction.

As examples, the TOC tracking structure may be the TOC cache itself or it may be an in-memory table representation. Other examples are also possible. Further, details associated with storing TOC values into the tracking structure are described with reference to FIG. 18. This processing is performed by, for instance, a loader.

Figure 18:
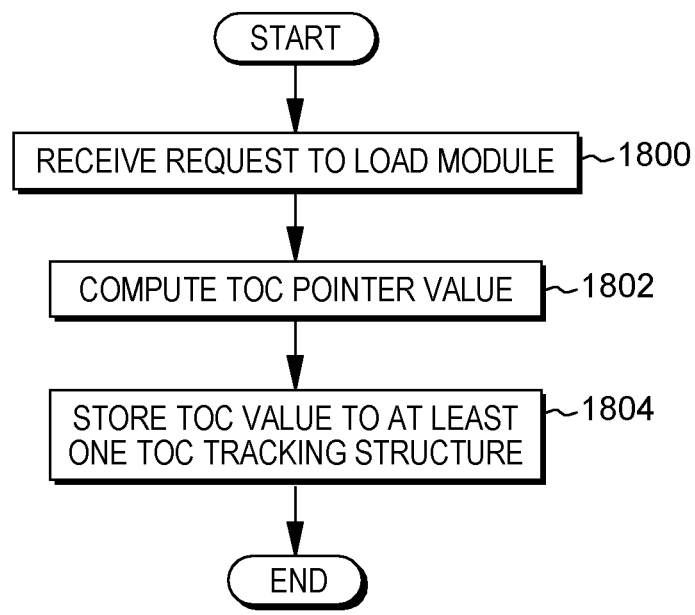
FIG. 18 depicts one example of storing TOC values into a TOC tracking structure, in accordance with an aspect of the present invention.

Referring to FIG. 18, the loader receives a request to load a module, STEP 1800, and computes at least one TOC pointer for the loaded module, STEP 1802. That TOC value is stored in a TOC tracking structure, e.g., in conjunction with the address range to which the module has been loaded, STEP 1804. The stored value may then be returned for a particular function or stored in a TOC cache for later retrieval, etc.

In one embodiment, when the tracking structure is, e.g., an in-memory structure, and a TOC value is not found in the TOC cache, control is transferred to software using, e.g., an interrupt, or user-mode event based branch. The software handler then reloads the value, e.g., by accessing the in-memory structure storing the address range and TOC value corresponding to each module. In another embodiment, the in-memory TOC structure is architecturally defined and a hardware handler reloads the TOC cache directly from the in-memory structure. In one embodiment, the software handler reloads both the TOC cache and the in-memory structure when loading a module. Other variations are possible.

In accordance with a further aspect of the present invention, a read-only TOC register and TOC addressing modes are included in an instruction set architecture (ISA). The read-only TOC register is, for instance, a pseudo or virtual register that provides a TOC value for a given module (e.g., by accessing a TOC cache or an in-memory table). That is, it is not a hardware or architected register and does not have storage backing it, but, instead provides a TOC value to be used when, e.g., a selected register number is referenced. The TOC value is initialized from, for example, a value stored in a TOC base table that may be loaded in conjunction with module initialization. A TOC base table can correspond to one or more of a TOC cache of FIGS. 14 and 16, or an in-memory structure. Yet other formats can be used to store and provide a TOC base value at a given instruction address in conjunction with one or more aspects of the present invention.

Figure 19:
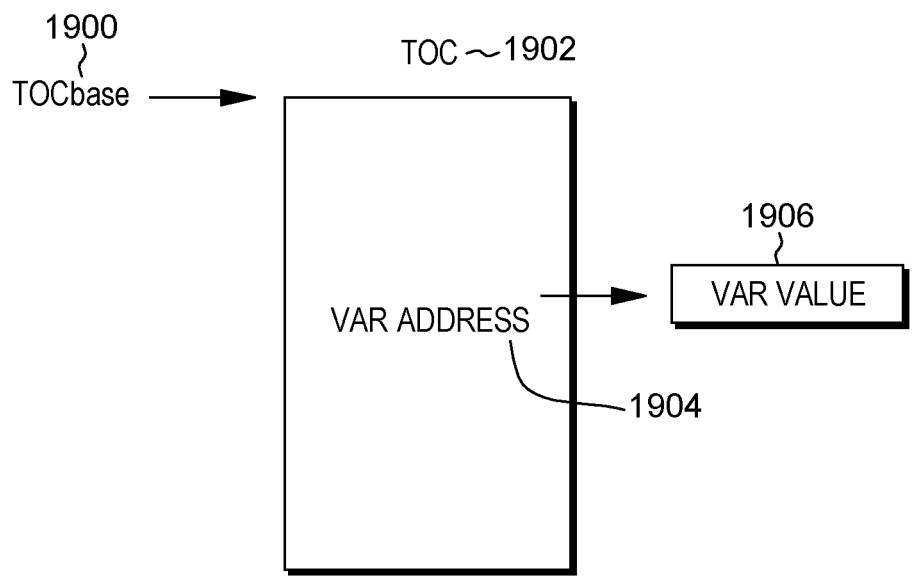
FIG. 19 depicts one example of a TOC referenced by a read-only TOC register, in accordance with an aspect of the present invention.

One example of using a read-only TOC register is described with reference to FIG. 19. As shown, a read-only TOC register 1900, referred to herein as TOCbase, is a pointer to a location in a TOC 1902. TOC 1902 includes one or more variable addresses 1904 indicating the location of a corresponding variable holding variable values 1906. The read-only TOC register, TOCbase, is referenced by an addressing mode or is implicit in an instruction or as a prefix. The processor performs a TOC value look-up responsive to the TOCbase being specified as the addressing mode or as a register of an addressing mode, and the obtained TOC value is used in lieu of a value provided by a general purpose register specified as a base register.

In one embodiment, when there are provided n bits to encode $2^n$ registers in an instruction set, one of the $2^n$ register numbers is defined to refer to the value of the TOC pointer, and when that register is specified, the value of the TOC pointer is used as a value for the register.

In further aspects, various instructions are provided that may use a read-only register. For instance, various load TOC-Relative Long instructions are provided, as described with reference to FIGS. 20A-20C, and one or more Load Address TOC-Relative Long instructions may be provided, an example of which is described with reference to FIG. 21. Other examples are also possible.

Figure 20A:
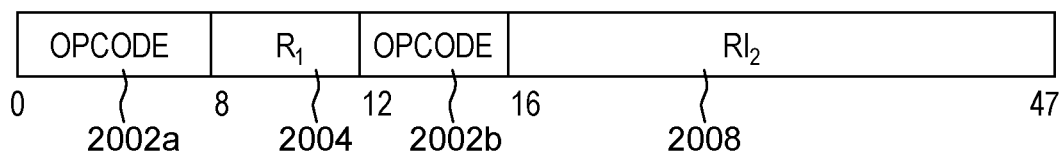
FIGS. 20A-20C depict examples of Load TOC-Relative Long instructions, in accordance with aspects of the present invention.

As shown in FIG. 20A, a Load TOC-Relative Long instruction 2000 includes a plurality of operation code (opcode) fields 2002a, 2002b including an opcode specifying a Load TOC-Relative Long (LTL) operation; a first operand field ($R_1$) 2004 to indicate a location (e.g., register) of a first operand; and a second operand field ($RI_2$) 2008 that is an immediate field, the contents of which are used as a signed binary integer designating one of bytes, halfwords, words, double words, etc. that are added to the value of the TOC pointer at the present instruction address to form the address of the second operand in storage (the TOC is defined by external means—e.g., using a program loader, an STR instruction, a TOC table, a TOC cache, etc.).

Figure 20B:
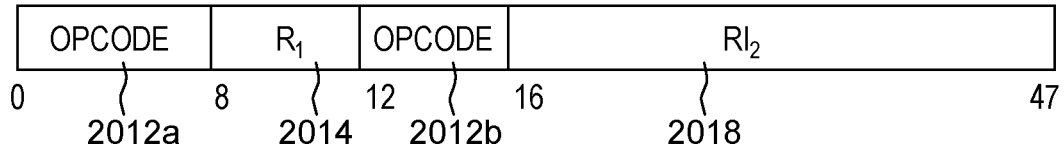
Figure 20C:
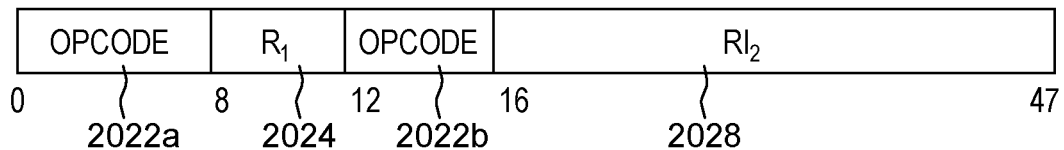

Other embodiments of Load TOC-Relative Long instructions are also provided, as depicted in FIGS. 20B-20C. Each Load TOC-Relative Long instruction (LGTL) 2010 (FIG. 20B) and LGFTL 2020 (FIG. 20C) includes opcode fields 2012a, 2012b; 2022a, 2022b; a first operand field ($R_1$) 2014, 2024 to indicate a location (e.g., register) of a first operand; and a second operand field ($R_2$) 2018, 2028 that is an immediate field, the contents of which are used as a signed binary integer designating one of bytes, halfwords, words, double words, etc. that are added to the value of the TOC pointer at the present instruction address to form the address of the second operand in storage (the TOC is defined by external means—e.g., using a program loader, an STR instruction, a TOC table, a TOC cache, etc.).

The second operand is placed unchanged at the first operand location, except that, for Load TOC Relative Long (LGFTL), it is sign extended.

For Load TOC-Relative Long (LTL), the operands are, e.g., 32 bits, and for Load TOC-Relative Long (LGTL), the operands are 64 bits. For Load TOC-Relative Long (LGFTL), the second operand is treated as a 32-bit signed binary integer and the first operand is treated as a 64-bit signed binary integer.

When DAT is on, the second operand is accessed using the same addressing-space mode as that used to access the instruction. When DAT is off, the second operand is accessed using a real address.

For Load TOC-Relative Long (LTL, LGFTL), the second operand is to be aligned on a word boundary, and for Load TOC-Relative Long (LGTL), the second operand is aligned on a doubleword boundary; otherwise, a specification exception may be recognized.

Figure 21:
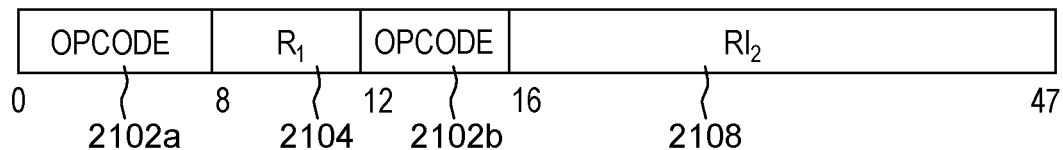
FIG. 21 depicts one example of a Load Address TOC-Relative Long instruction, in accordance with an aspect of the present invention.

One example of a Load Address TOC-Relative Long instruction is described with reference to FIG. 21. As depicted, a Load Address TOC-Relative Long instruction 2100 includes a plurality of operation code fields 2102a, 2102b including an opcode that indicates a Load Address TOC-Relative Long operation; a first operand field ($R_1$) 2104 to indicate a location (e.g., register) of a first operand; and a second operand field ($R_2$) 2108 that is an immediate field, the contents of which are a signed binary integer specifying the number of one of bytes, halfwords, words, doublewords, and so forth, that is added to value of the TOC pointer at the current address to generate a computed address.

The address specified using the $RI_2$ field is placed in general register $R_1$. The address is obtained by adding the $RI_2$ field to the value of the TOC at the current address.

In the 24-bit addressing mode, the address is placed in bit positions 40-63, bits 32-39 are set to zeros, and bits 0-31 remain unchanged. In the 31-bit addressing mode, the address is placed in bit positions 33-63, bit 32 is set to zero, and bits 0-31 remain unchanged. In the 64-bit addressing mode, the address is placed in bit positions 0-63.

No storage references for operands take place, and the address is not inspected for access exceptions.

Figure 22:
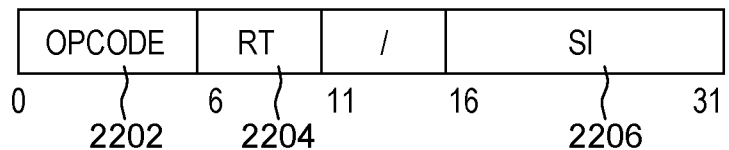
FIG. 22 depicts one example of a TOC add immediate shift instruction, in accordance with an aspect of the present invention.

In a further aspect, a TOC add immediate shifted (tocaddis) instruction is provided (for, e.g., a RISC-style architecture). As depicted in FIG. 22, in one example, a TOC add immediate shifted instruction 2200 includes an operation code field 2202 including an opcode specifying a TOC add immediate shifted operation; a target return (RT) field 2204 indicating a target return value; and a shift immediate (SI) field 2206 specifying a shift amount to be applied to the TOC value.

As one example, the following defines tocaddis:
tocaddis RT,SI
RT (TOC)+EXTS (SI$\|^{16}$0)

The sum TOC+(SI$\|$0x0000) is placed into register RT. EXTS refers to extended sign and $\|$ refers to concatenation.

Figure 23:
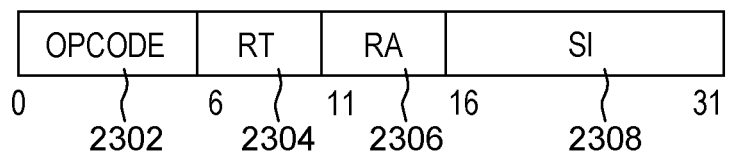
FIG. 23 depicts one example of an add TOC immediate shifted instruction, in accordance with an aspect of the present invention.

In a further aspect, TOC-indicating prefix instructions may be provided. For instance, an add TOC immediate shifted instruction, addtocis+, is provided, which is a prefix instruction providing information for a next instruction. Referring to FIG. 23, in one example, an add TOC immediate shifted instruction 2300 includes, for instance, an operation code field 2302 having an opcode specifying an add TOC immediate shifted operation; a target register (RT) field 2304 to hold a result; an operand field (RA) 2306; and a shift immediate (SI) field 2308.

As an example,
addtocis+RT,RA,SI
if RA=0 then RT←(TOC)+EXTS (SI$\|^{16}$0) else RT←(RA)+EXTS (SI$\|^{16}$0)

The sum (RA|TOC)+(SI$\|$0x0000) is provided as a source for references to register RT for the next sequential instruction only. addtocis+ is an instruction prefix, and modifies the following instruction to use the value computed for RT as input when RT is specified. The instruction indicates that RT becomes unused after the next sequential instruction is executed and its value will be undefined. If execution is interrupted after the addtocis+ instruction and prior to the next sequential instruction, the state will be updated in a manner to allow execution to resume with the next instruction and produce a correct result (i.e., RT will be written, or another implementation-defined method for retaining the effect of modifying the next sequential instruction's RT source will be used). It is noted that addTOCis+ uses the value of TOCbase, not the contents of GPR0, if RA=0.

The prefix instruction may have further options, such as a displacement specifier field that indicates whether additional immediate bits are to be used. Additionally, it may include one or more additional immediate fields that include values to be employed with (e.g., added to, OR'd with, etc.) operands of the successor instruction.

Other prefix options may be used including a TOC prefix and/or a TOC prefix with an option to override a selectable one of the operands. For instance, a prefix instruction may be provided that indicates that a TOC value should be used instead of one of the operands of a successor instruction. In one example, the operand is selectable.

Additionally, aspects of a prefix instruction (e.g., addtocis) and a subsequent instruction may be fused to facilitate processing. For instance, if a prefix instruction with a displacement is specified and the subsequent instruction also includes a displacement, then the displacement may correspond to an immediate shifted and an immediate displacement. Other possibilities exist.

A particular optimization example using addtocis is shown below. In this example, an n (e.g., 3) instruction candidate sequence includes, for instance: addtocis+ r4, toc, upper; addi r4, r4, lower; and lvx* vr2, r0, r4. This sequence may be represented in the following template:
i1=addtocis+ <r1>, <r2>, <upper>
i2=addi <r1>, <r1>, <lower>
i3=lvx* <vrt>, r0, <r1>
=> and optimized to the following internal operation:
lvd <vrt>, toc_or_gpr(<r2>), combined (<upper>, <lower>)

The addtocis instruction is similar to addis, but introduces the value of the TOC, rather than the constant 0, when the RA field has a value 0. In one example, lvx* is an instruction form that defines the base register (e.g., 4 in this example) as having an unspecified value after execution of the instruction. In one example, lvx* is a form of the lvx (load vector indexed) instruction indicating a last use of at least one register (e.g., defined herein to be the register indicated as <r1> in the template). Lvd is a load vector operation with an implemented defined displacement. The toc_or_gpr function handles expanding the TOC special case, since the lvd would otherwise handle the RA operand similar to all other RA operands as a 0 value representing 0, and the other register values representing the logical register.

Further opportunities may exist to reduce a complex sequence of instructions that includes a TOC instruction or a TOC-using instruction into a simpler sequence of instructions.

One embodiment of an execution flow used to manage TOC operands is described with reference to FIG. 24. In one example, a processor is executing this logic.

Figure 24:
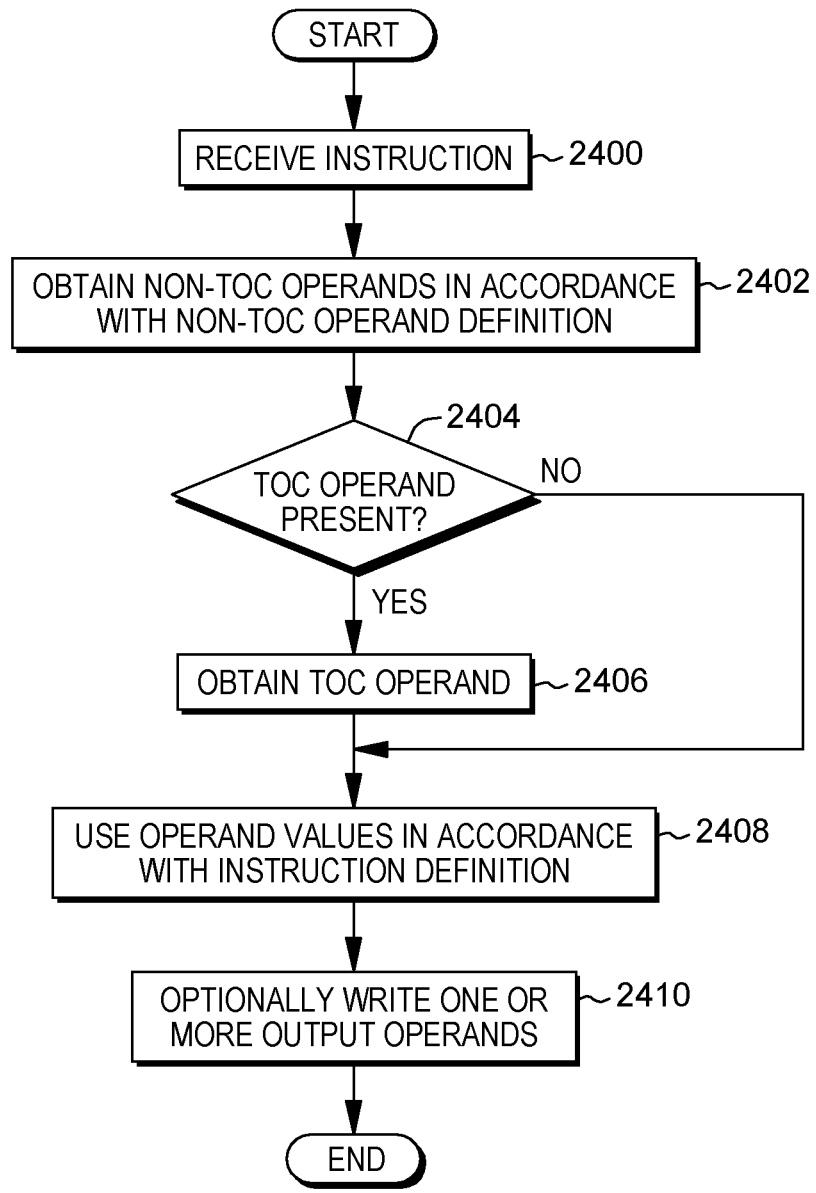
FIG. 24 depicts one embodiment of processing an instruction that may include TOC operands, in accordance with an aspect of the present invention.

Referring to FIG. 24, in one example, an instruction is received, STEP 2400. Any non-TOC operands of the instruction are obtained in accordance with a non-TOC operand definition, STEP 2402. For instance, if an instruction operand specifies a general purpose register, the data is obtained from that register, etc.

A determination is made as to whether a TOC operand is present in the instruction, INQUIRY 2404. That is, is there a operand in the instruction that explicitly or implicitly uses a TOC pointer? If a TOC operand is present, then the TOC operand is obtained, as described below, STEP 2406. Thereafter, or if a TOC operand is not present, any obtained operand values are used in accordance with the instruction definition, STEP 2408. Optionally, one or more output operands are written, STEP 2410.

Figure 25:
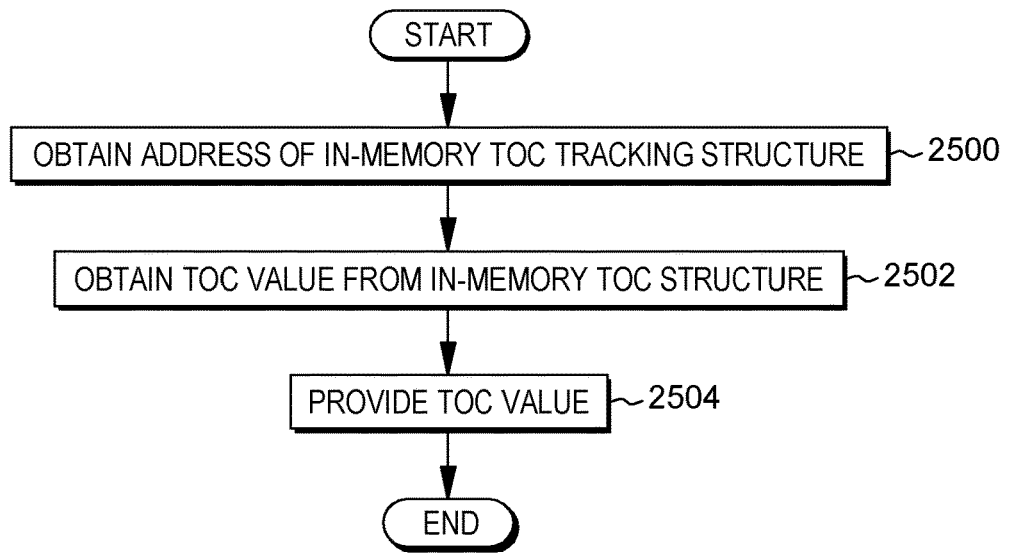
FIGS. 25-27 depicts embodiments of obtaining TOC operands for an instruction, in accordance with aspects of the present invention.

In one example, a TOC operand is obtained from an in-memory TOC structure, as described with reference to FIG. 25. An address of in-memory TOC tracking structure is obtained, STEP 2500, and from the in-memory TOC structure, a TOC value is obtained for the module that includes the instruction, STEP 2502. That TOC value is then provided for use by the instruction, STEP 2504.

Figure 26:
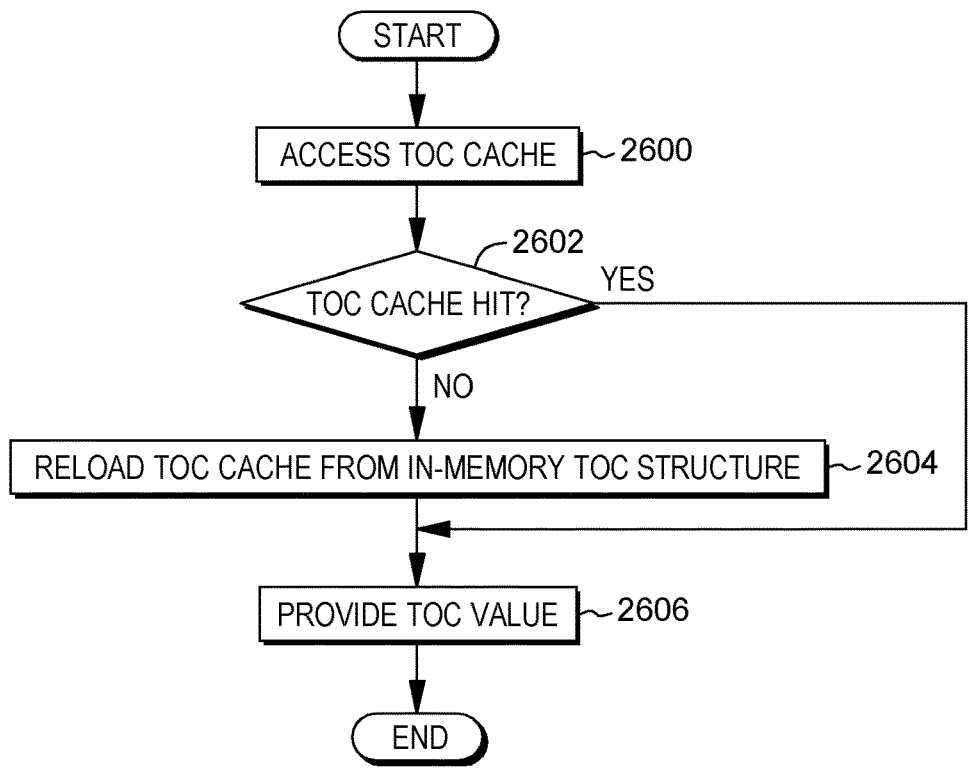

In another example, the TOC operand is obtained from a TOC cache, which is backed by an in-memory structure, as described with reference to FIG. 26. In this example, the TOC cache is accessed, STEP 2600, and a determination is made as to whether there is a TOC cache hit, INQUIRY 2602. That is, is there an entry in the cache for the module including the instruction? If there is not a TOC cache hit, then the TOC cache is reloaded from the in-memory TOC cache structure, STEP 2604. Thereafter, or if there is a TOC cache hit, the TOC value for the module that includes the instruction is obtained from the TOC cache and provided for use by the instruction, STEP 2606.

Figure 27:
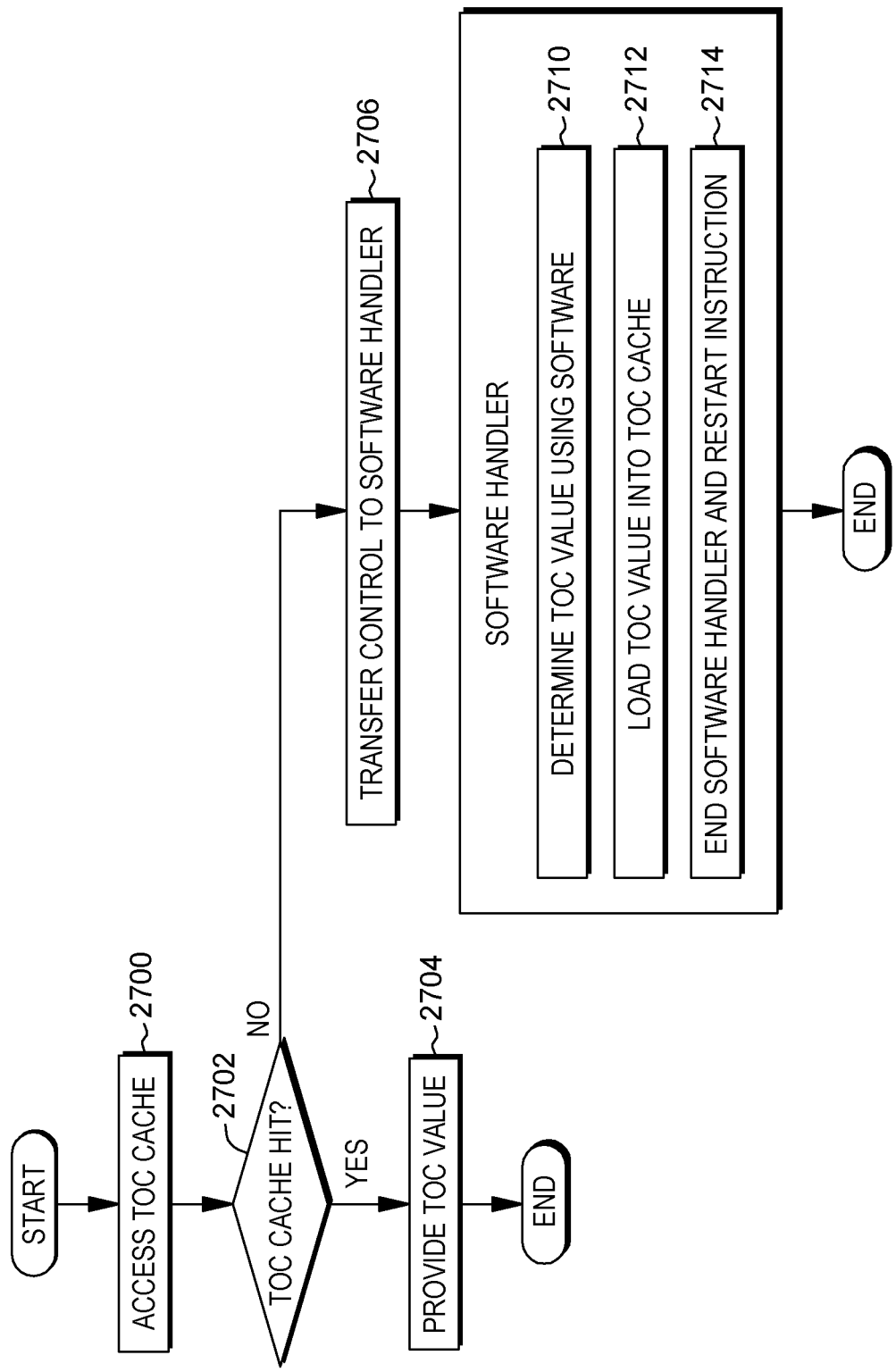

A further example of obtaining the TOC operand from a TOC cache backed by an in-memory structure is described with reference to FIG. 27. In this example, the TOC cache is accessed, STEP 2700, and a determination is made as to whether there is a TOC cache hit, INQUIRY 2702. If there is a TOC cache hit, then the TOC value is retrieved from the entry in the TOC cache corresponding to the module that includes the instruction and provided for use by the instruction, STEP 2704. If, however, there is no TOC cache hit, then control is transferred to a software handler, STEP 2706. The software handler determines a TOC value using software (e.g., obtains it from an in-memory tracking structure), STEP 2710, and loads the determined TOC value into the TOC cache, STEP 2712. The software handler ends and the instruction is restarted, STEP 2714.

To load the TOC cache from software, a Load TOC Cache (LTC) instruction may be used. For instance, LTC Rfrom, Rto, RTOC may be used to load an entry for <MODULE.Rfrom, MODULE.Rto, MODULE.TOC>. For instance, an entry is included in the cache and the address_from column is populated using Rfrom; the address_to column is populated using Rto; and the TOC value is populated using RTOC. In one embodiment, an entry is selected in accordance with a replacement policy of a particular implementation.

In another embodiment, a table entry is loaded by loading a plurality of control registers.

One example of a use case is described below:

```
char bar[MAX];
char foo(int idx)
{
  return bar[idx];
}
```

In accordance with the definition of the C programming language, the function foo returns a character from an array bar, in which the character position is indicated by the argument idx to function foo.

In accordance with one aspect of the present invention, a compiler translates this program to the following machine instruction sequence:

```
foo:
    LDX R4, TOCbase, bar@toc    // load starting address of bar from
                                // TOC using TOC pointer specified
                                // by "TOCbase" register
    LBZX R3, R4, R3             // load byte from bar + idx
    BLR                         // return from function foo
```

In accordance with one or more aspects of the present invention, a Set TOC Register instruction efficiently initializes a register to be loaded with the TOC value. Further, in accordance with an aspect of the present invention, since a Set TOC Register instruction is efficient, a TOC register value is not saved and restored in compiled code. Rather, when a subroutine is called, the TOC register value is abandoned. When a called function returns, the TOC value is not loaded. Rather, a new Set TOC Register instruction is generated to load the TOC register.

One example of compiler generated code to obtain the correct value of the TOC pointer based on an STR (Set TOC Register) instruction corresponding to the C program language function foo above is as follows:

```
foo:
    STR R4
    LDX R4, TOC, bar@toc    // load starting address of bar from
                            // TOC using TOC pointer in R4
    LBZX R3, R4, R3         // load byte from bar + idx
    BLR                     // return from function foo
```

Figure 28:
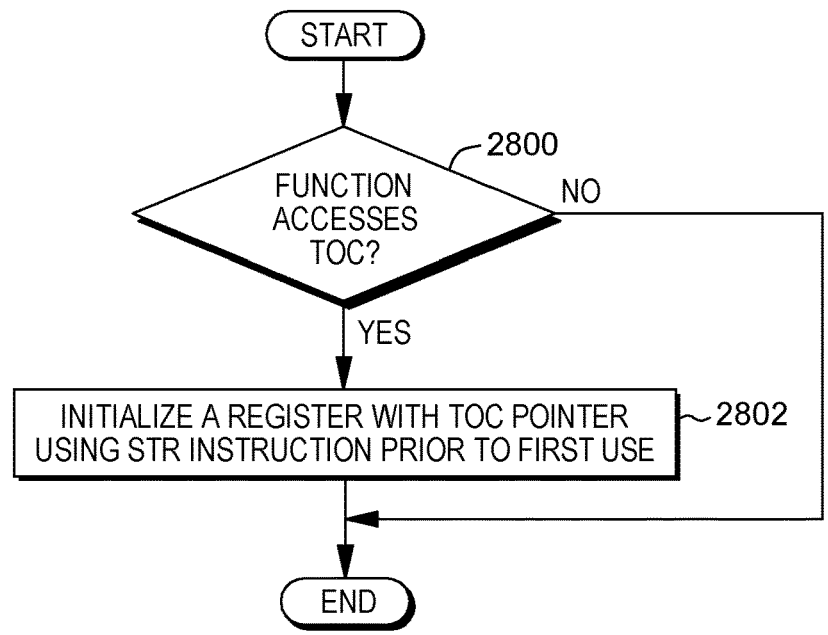
FIG. 28 depicts one example of a compilation flow associated with using a Set TOC Register instruction, in accordance with an aspect of the present invention.

One embodiment of initializing a register with the TOC pointer, as performed by the compiler, is described with reference to FIG. 28. Initially, a determination is made as to whether the function accesses the TOC, INQUIRY 2800. If not, then processing is complete. However, if the function accesses the TOC, then a register is initialized with the TOC pointer using, for instance, an STR instruction, prior to first use, STEP 2802. For example, the STR instruction is added to the code being compiled and used to initialize the TOC register. Other variations are possible.

Figure 29:
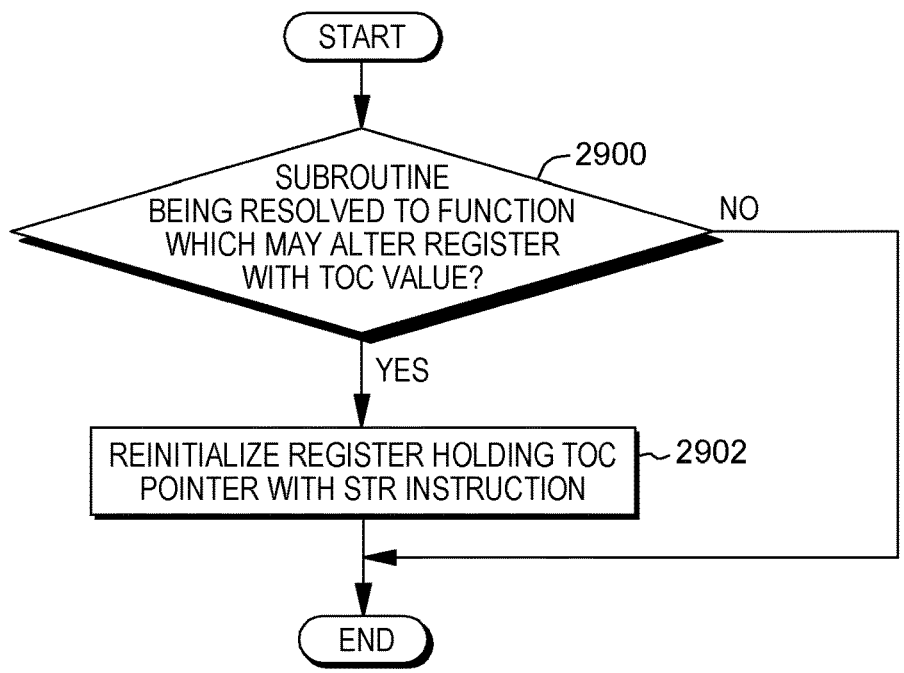
FIG. 29 depicts one example of a static linker flow associated with using a Set TOC Register instruction, in accordance with an aspect of the present invention.

In a further example, a static linker can initialize the TOC, as described with reference to FIG. 29. In this example, a determination is made as to whether the subroutine is being resolved to a function which may alter a register with the TOC value, INQUIRY 2900. If not, then processing is complete. Otherwise, the register holding the TOC pointer is reinitialized with, e.g., an STR instruction, STEP 2902. For example, the STR instruction is added to the code being compiled and used to initialize the TOC register. Other variations are possible.

An example use case is as follows. This more efficient code is generated in accordance with an aspect of the present invention:

```
func( )
{
    STR r2        // use instead of computing the TOC
    ...
    ...           // USE r2
    ...
    ...           // no need to save TOC value on the stack
    ...
    g( );
    ...
    STR r2        // obtain TOC from STR instruction, instead of
                  // reloading from stack
    ...
    ...           // USE r2
    ...
```

In addition to generating code with a TOC setting instruction, code may be generated using TOC read-only registers. This further obviates a need to load a GPR with the TOC, and thereby, reduces register pressure and overhead of loading the register, or of reloading it after a function call.

One example of compiler generated code to use a TOC read-only register is as follows:

```
char bar[MAX];
char foo(int idx)
{
    return bar[idx];
}
```

In accordance with the definition of the C programming language, the function foo returns a character from an array bar, in which the character position is indicated by the argument idx to function foo.

In accordance with one aspect of the present invention, a compiler translates this program to the following machine instruction sequence.

```
foo:
    LDX R4, TOCbase, bar@toc    // load starting address of bar from
                                // TOC using TOC pointer specified
                                // by "TOCbase" register
    LBZX R3, R4, R3             // load byte from bar + idx
    BLR                         // return from function foo
```

Figure 30:
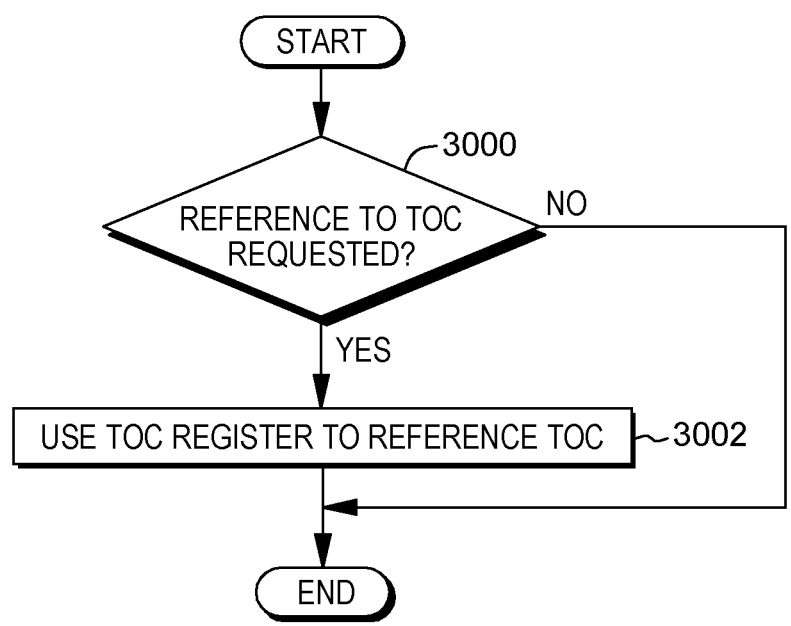
FIG. 30 depicts one example of a compilation flow associated with using TOC read-only registers, in accordance with an aspect of the present invention.

One example of a compilation flow to use a TOC read-only register to reference the TOC is described with reference to FIG. 30. In this example, a determination is made as to whether a reference to the TOC is requested, INQUIRY 3000. If not, then processing is complete. Otherwise, the TOC read-only register is used to reference the TOC, STEP 3002. For instance, an operation (e.g., an internal operation, an instruction, etc.) is included in the code being compiled and used to determine a pointer to the TOC. Other variations are possible.

An example use case is as follows. This more efficient code is generated in accordance with an aspect of the present invention:

```
func( )
{
                  // no need to load r2 with TOC value
    ...
    LTL...        // USE TOCbase REGISTER AS OPERAND
    ...
                  // no need to save TOC value
    ...
    g( );
    ...
                  // no need to restore TOC value in r2
    ...
    LTL...        // USE TOCbase REGISTER AS OPERAND
    ...
```

One or more aspects of the present invention are inextricably tied to computer technology and facilitate processing within a computer, improving performance thereof. Further details of one embodiment of facilitating processing within a computing environment, as it relates to one or more aspects of the present invention, are described with reference to FIGS. 31A-31B.

Figure 31A:
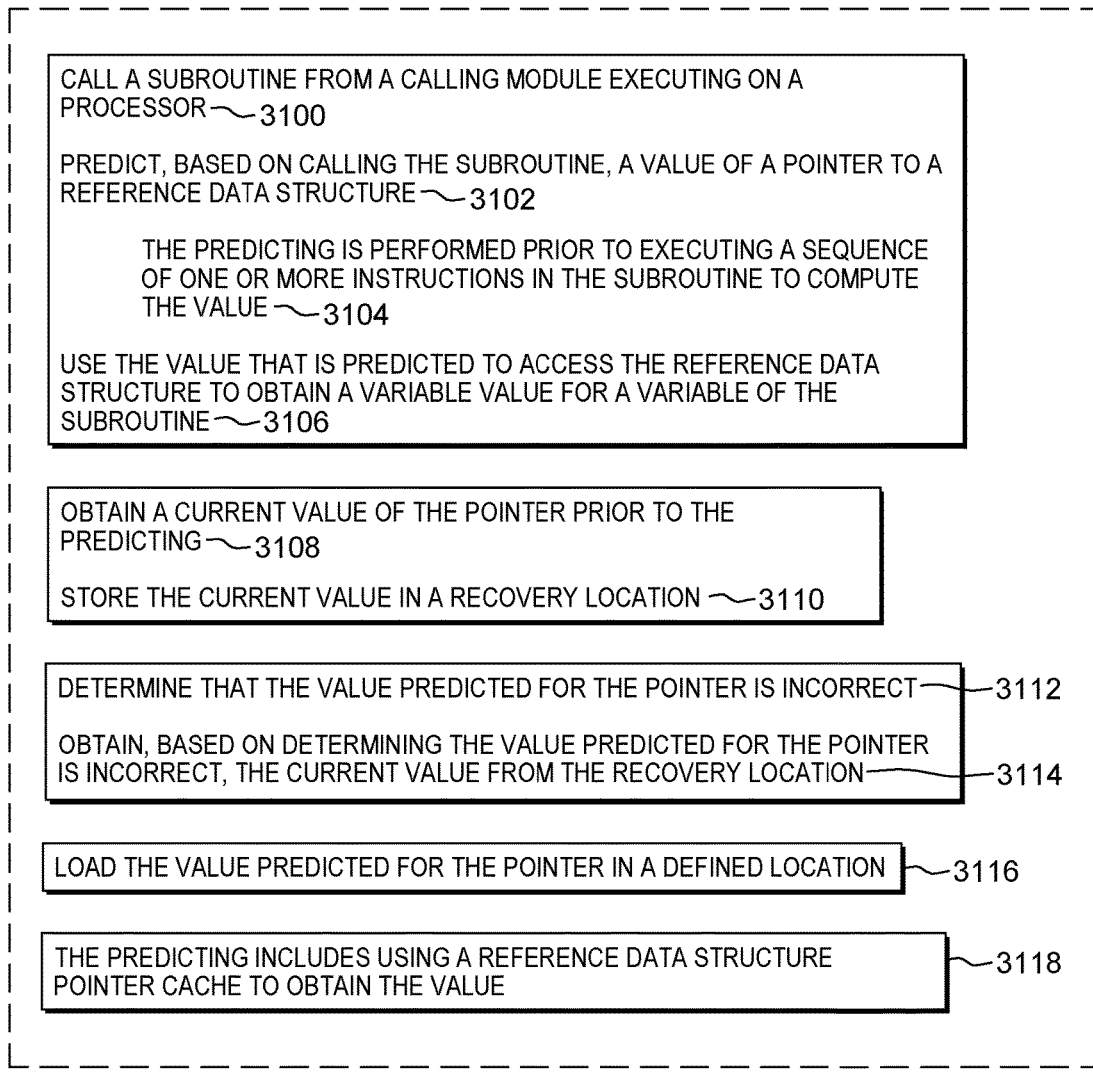

Referring to FIG. 31A, in one embodiment, a subroutine is called from a calling module executing on a processor (3100). Based on calling the subroutine, a value of a pointer to a reference data structure is predicted (3102). The predicting is performed prior to executing a sequence of one or more instructions in the subroutine to compute the value (3104). The value that is predicted is used to access the reference data structure to obtain a variable value for a variable of the subroutine (3106).

In a further aspect, a current value of the pointer is obtained prior to the predicting (3108), and the current value is stored in a recovery location (3110). A determination is made, in one embodiment, that the value predicted for the pointer is incorrect (3112). Based on determining the value predicted for the pointer is incorrect, the current value is obtained from the recovery location (3114).

As one example, the value predicted for the pointer is loaded in a defined location (3116). Further, in one example, the predicting includes using a reference data structure pointer cache to obtain the value (3118).

In a further aspect, with reference to FIG. 31B, a determination is made as to whether a current instruction in the subroutine corresponds to the sequence of one or more instructions to compute the value (3120). Based on determining the current instruction corresponds to the sequence of one or more instructions to compute the value, a check instruction to check the prediction of the value is inserted in the code (3122). The inserting replaces the sequence of one or more instructions (3124).

In a further embodiment, a determination is made as to whether a check indicator is set (3126). Based on determining the check indicator is set, a determination is made as to whether the current instruction corresponds to the sequence of one or more instructions to compute the value (3128). Further, in one embodiment, based on determining the current instruction does not correspond to the sequence of one or more instructions to compute the value, a determination is made as to whether the current instruction corresponds to a sequence of one or more instructions to use the value (3130). Based at least on determining that the current instruction corresponds to the sequence of one or more instructions to use the value, recovery is performed (3132).

As an example, the sequence of one or more instructions includes a load instruction (3134). Further in one embodiment, a current value of the pointer prior to the predicting is obtained (3136), and the current value is stored in a rename register for use in recovery (3138).

Other variations and embodiments are possible.

Figure 32A:
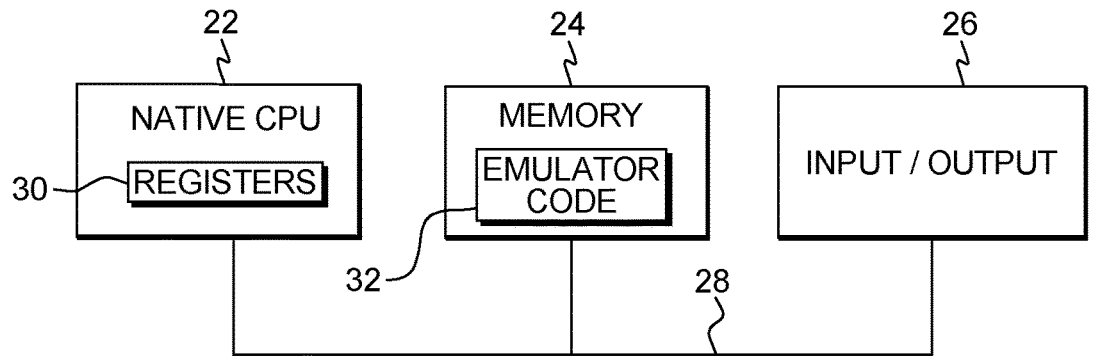
FIG. 32A depicts another example of a computing environment to incorporate and use one or more aspects of the present invention.

Other types of computing environments may also incorporate and use one or more aspects of the present invention, including, but not limited to, emulation environments, an example of which is described with reference to FIG. 32A. In this example, a computing environment 20 includes, for instance, a native central processing unit (CPU) 22, a memory 24, and one or more input/output devices and/or interfaces 26 coupled to one another via, for example, one or more buses 28 and/or other connections. As examples, computing environment 20 may include a PowerPC processor or a pSeries server offered by International Business Machines Corporation, Armonk, N.Y.; and/or other machines based on architectures offered by International Business Machines Corporation, Intel, or other companies.

Native central processing unit 22 includes one or more native registers 30, such as one or more general purpose registers and/or one or more special purpose registers used during processing within the environment. These registers include information that represents the state of the environment at any particular point in time.

Moreover, native central processing unit 22 executes instructions and code that are stored in memory 24. In one particular example, the central processing unit executes emulator code 32 stored in memory 24. This code enables the computing environment configured in one architecture to emulate another architecture. For instance, emulator code 32 allows machines based on architectures other than the z/Architecture, such as PowerPC processors, pSeries servers, or other servers or processors, to emulate the z/Architecture and to execute software and instructions developed based on the z/Architecture.

Figure 32B:
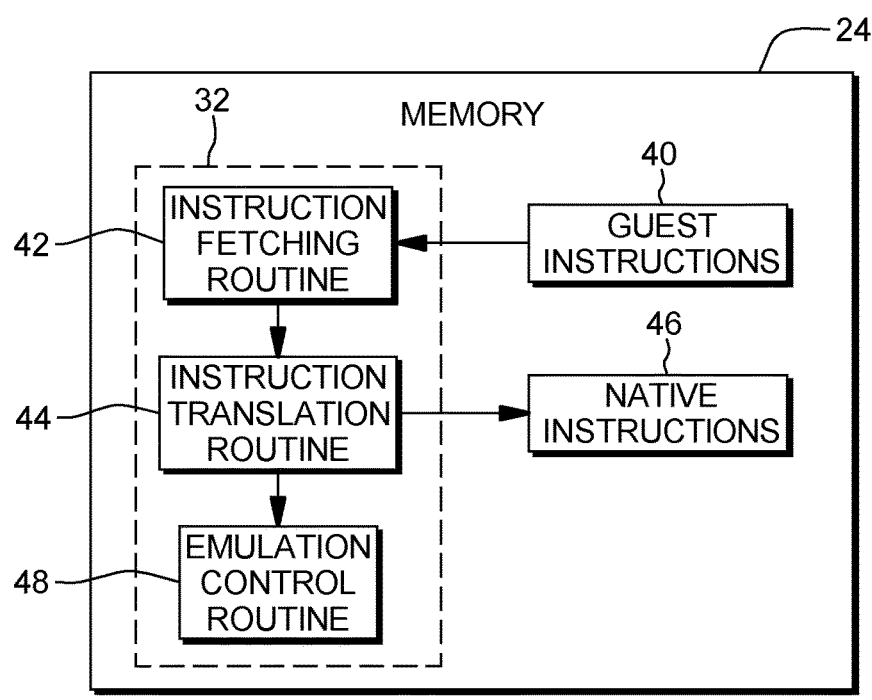
FIG. 32B depicts further details of the memory of FIG. 32A.

Further details relating to emulator code 32 are described with reference to FIG. 32B. Guest instructions 40 stored in memory 24 comprise software instructions (e.g., correlating to machine instructions) that were developed to be executed in an architecture other than that of native CPU 22. For example, guest instructions 40 may have been designed to execute on a z/Architecture processor, but instead, are being emulated on native CPU 22, which may be, for example, an Intel processor. In one example, emulator code 32 includes an instruction fetching routine 42 to obtain one or more guest instructions 40 from memory 24, and to optionally provide local buffering for the instructions obtained. It also includes an instruction translation routine 44 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 32 includes an emulation control routine 48 to cause the native instructions to be executed. Emulation control routine 48 may cause native CPU 22 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 46 may include loading data into a register from memory 24; storing data back to memory from a register; or performing some type of arithmetic or logic operation, as determined by the translation routine.

Each routine is, for instance, implemented in software, which is stored in memory and executed by native central processing unit 22. In other examples, one or more of the routines or operations are implemented in firmware, hardware, software or some combination thereof. The registers of the emulated processor may be emulated using registers 30 of the native CPU or by using locations in memory 24. In embodiments, guest instructions 40, native instructions 46 and emulator code 32 may reside in the same memory or may be disbursed among different memory devices.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 40 that is obtained, translated and executed may be, for instance, one of the instructions described herein. The instruction, which is of one architecture (e.g., the z/Architecture), is fetched from memory, translated and represented as a sequence of native instructions 46 of another architecture (e.g., PowerPC, pSeries, Intel, etc.). These native instructions are then executed.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 33:
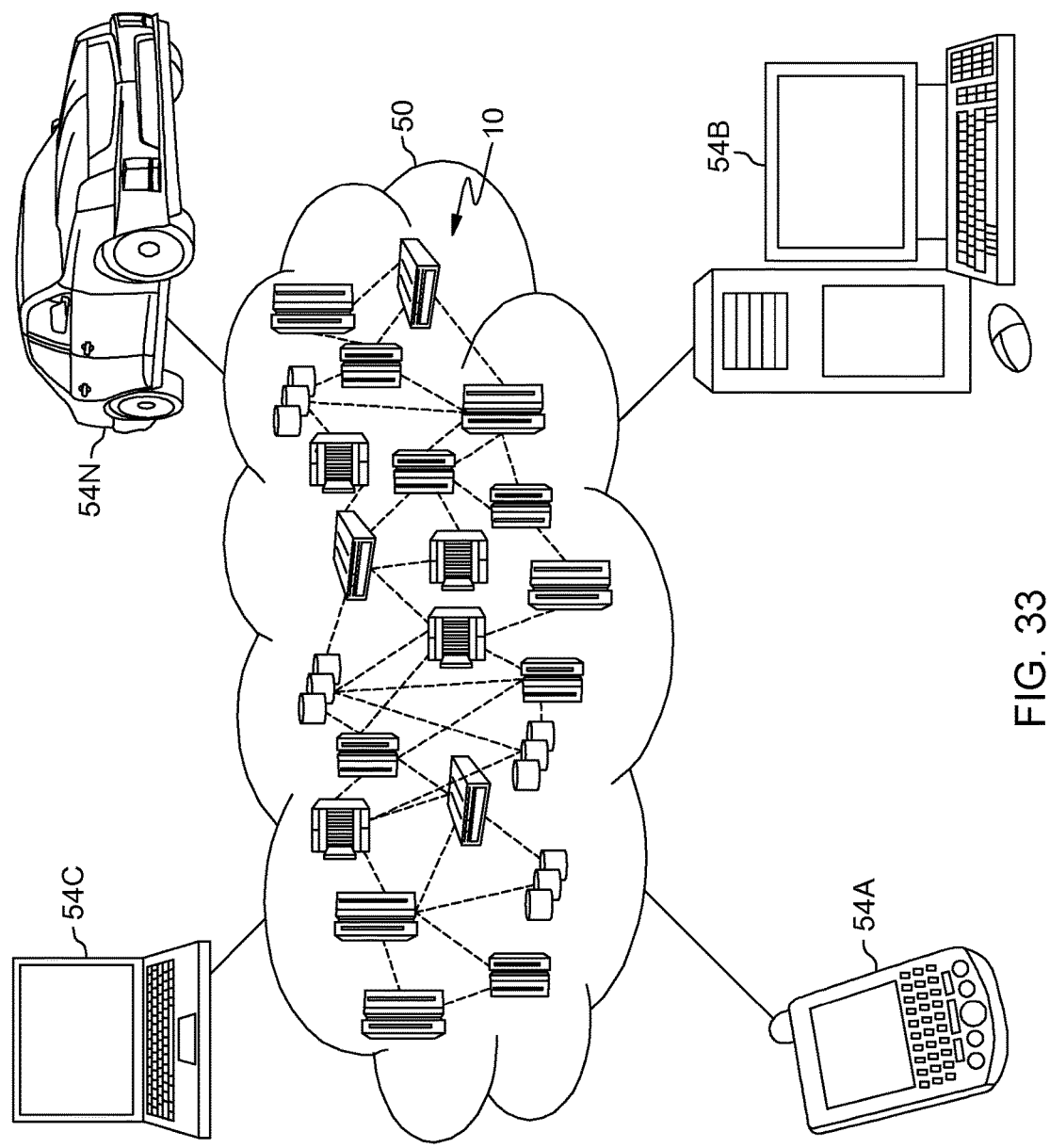
FIG. 33 depicts one embodiment of a cloud computing environment.

Referring now to FIG. 33, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 33 are intended to be illustrative only and that computing nodes 10 and cloud computing environment 50 can communicate with any type of computerized device over any type of network and/or network addressable connection (e.g., using a web browser).

Figure 34:
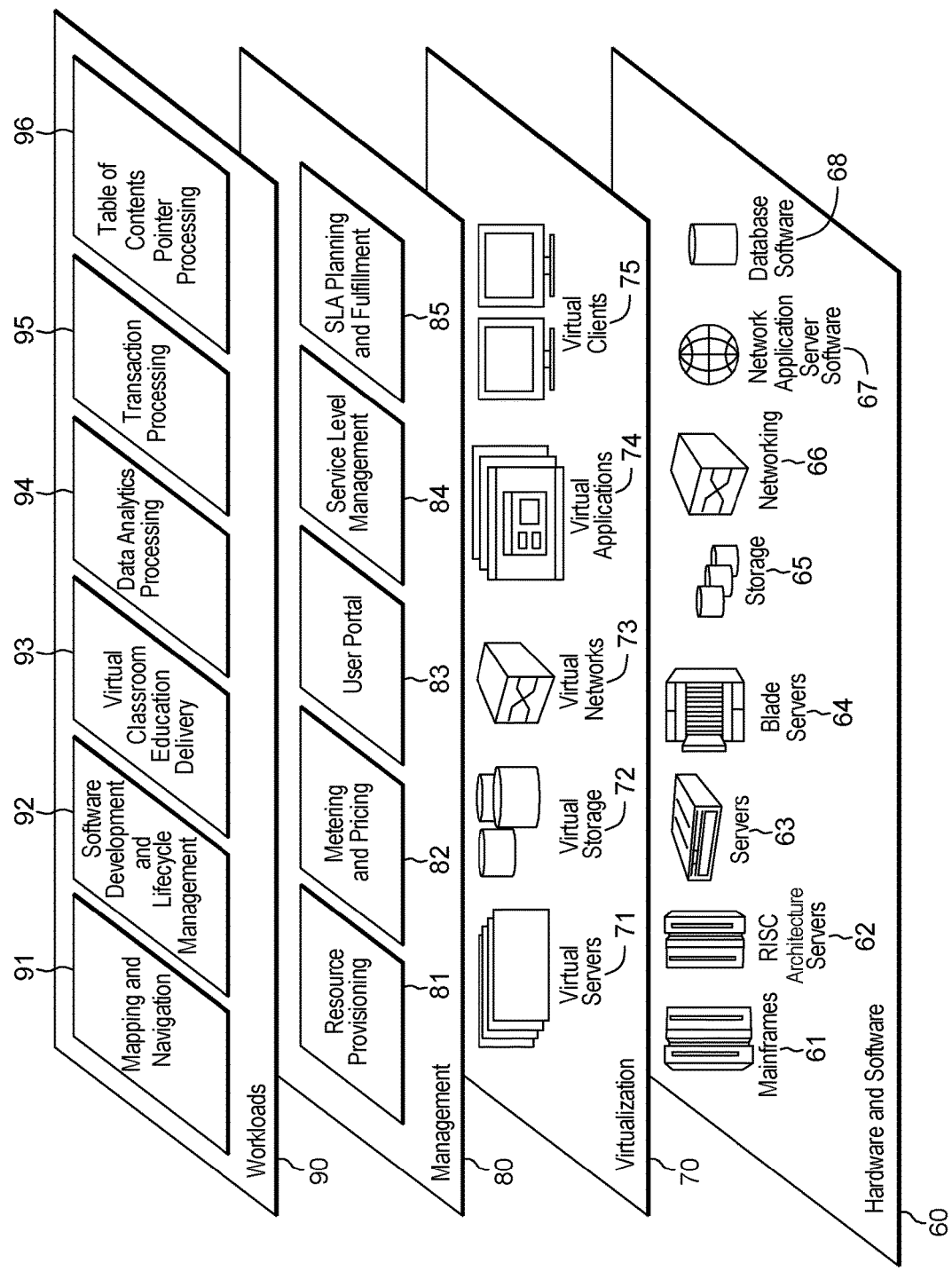
FIG. 34 depicts one example of abstraction model layers.

Referring now to FIG. 34, a set of functional abstraction layers provided by cloud computing environment 50 (FIG. 33) is shown. It should be understood in advance that the components, layers, and functions shown in FIG. 34 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and table of contents pointer processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions or operations may be used. Additionally, different registers may be used and/or other types of indications (other than register numbers) may be specified. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    a computer readable storage medium readable by a processing circuit and storing instructions for performing a method comprising:
        calling a subroutine from a calling module executing on a processor;
        predicting, based on calling the subroutine, a value of a pointer to a reference data structure, the predicting being performed prior to executing a sequence of one or more instructions in the subroutine to compute the value of the pointer;
        determining whether a current instruction in the subroutine corresponds to the sequence of one or more instructions to compute the value of the pointer;
        inserting in the code, based on determining the current instruction corresponds to the sequence of one or more instructions to compute the value, a check instruction to check the prediction of the value, the inserting replacing the sequence of one or more instructions; and
        using the value that is predicted to access the reference data structure to obtain a variable value for a variable of the subroutine.

2. The computer program product of claim 1, wherein the method further comprises:
    obtaining a current value of the pointer prior to the predicting; and
    storing the current value in a recovery location.

3. The computer program product of claim 2, wherein the method further comprises:
    determining that the value predicted for the pointer is incorrect; and
    obtaining, based on determining the value predicted for the pointer is incorrect, the current value from the recovery location.

4. The computer program product of claim 1, wherein the method further comprises loading the value predicted for the pointer in a defined location.

5. The computer program product of claim 4, wherein the method further comprises:
    determining whether a check indicator is set; and
    determining whether the current instruction corresponds to the sequence of one or more instructions to compute the value, based on determining the check indicator is set.

6. The computer program product of claim 4, wherein the method further comprises:
    determining, based on determining the current instruction does not correspond to the sequence of one or more instructions to compute the value, whether the current instruction corresponds to a sequence of one or more instructions to use the value; and
    performing recovery, based at least on determining that the current instruction corresponds to the sequence of one or more instructions to use the value.

7. The computer program product of claim 1, wherein the sequence of one or more instructions comprises a load instruction.

8. The computer program product of claim 1, wherein the method further comprises:

obtaining a current value of the pointer prior to the predicting; and storing the current value in a rename register for use in recovery.

9. The computer program product of claim 1, wherein the predicting comprises using a reference data structure pointer cache to obtain the value.

10. A computer system for facilitating processing within a computing environment, the computer system comprising:
a memory; and
a processor in communication with the memory, wherein the computer system is configured to perform operations comprising:
calling a subroutine from a calling module executing on a processor;
predicting, based on calling the subroutine, a value of a pointer to a reference data structure, the predicting being performed prior to executing a sequence of one or more instructions in the subroutine to compute the value of the pointer;
determining whether a current instruction in the subroutine corresponds to the sequence of one or more instructions to compute the value of the pointer;
inserting in the code, based on determining the current instruction corresponds to the sequence of one or more instructions to compute the value, a check instruction to check the prediction of the value, the inserting replacing the sequence of one or more instructions; and
using the value that is predicted to access the reference data structure to obtain a variable value for a variable of the subroutine.

11. The computer system of claim 10, wherein the operations further comprise:
obtaining a current value of the pointer prior to the predicting; and
storing the current value in a recovery location.

12. The computer system of claim 11, wherein the operations further comprise:
determining that the value predicted for the pointer is incorrect; and
obtaining, based on determining the value predicted for the pointer is incorrect, the current value from the recovery location.

13. The computer system of claim 10, wherein the operations further comprise:
determining, based on determining the current instruction does not correspond to the sequence of one or more instructions to compute the value, whether the current instruction corresponds to a sequence of one or more instructions to use the value; and
performing recovery, based at least on determining that the current instruction corresponds to the sequence of one or more instructions to use the value.

14. The computer system of claim 10, wherein the operations further comprise:
obtaining a current value of the pointer prior to the predicting; and
storing the current value in a rename register for use in recovery.

15. The computer system of claim 10, wherein the operations further comprise loading the value predicted for the pointer in a defined location.

16. The computer system of claim 10, wherein the operations further comprise:
determining whether a check indicator is set; and
determining whether the current instruction corresponds to the sequence of one or more instructions to compute the value, based on determining the check indicator is set.

17. The computer system of claim 10, wherein the sequence of one or more instructions comprises a load instruction.

18. The computer system of claim 10, wherein the predicting comprises using a reference data structure pointer cache to obtain the value.

* * * * *